(12) United States Patent
Kovacs

(10) Patent No.: US 12,081,255 B2
(45) Date of Patent: Sep. 3, 2024

(54) APPARATUS AND METHOD FOR SUPPORTING AN ARTICLE

(71) Applicant: Kustom Cycles, Inc., Mitchell, SD (US)

(72) Inventor: Tamas Kovacs, Basalt, CO (US)

(73) Assignee: Kustom Cycles, Inc., Mitchell, SD (US)

( * ) Notice: Subject to any disclaimer, the term of this patent is extended or adjusted under 35 U.S.C. 154(b) by 178 days.

(21) Appl. No.: 17/813,350

(22) Filed: Jul. 19, 2022

(65) Prior Publication Data

US 2023/0120777 A1  Apr. 20, 2023

Related U.S. Application Data

(63) Continuation of application No. 17/001,773, filed on Aug. 25, 2020, now Pat. No. 11,405,066, which is a continuation of application No. 16/000,613, filed on Jun. 5, 2018, now Pat. No. 10,756,773, which is a continuation of application No. 14/988,217, filed on Jan. 5, 2016, now Pat. No. 9,991,922.

(60) Provisional application No. 62/099,945, filed on Jan. 5, 2015.

(51) Int. Cl.
*H04B 1/3877* (2015.01)
*A45F 5/00* (2006.01)
*H04M 1/04* (2006.01)

(52) U.S. Cl.
CPC ............ *H04B 1/3877* (2013.01); *A45F 5/00* (2013.01); *H04M 1/04* (2013.01); *A45F 2200/0516* (2013.01); *A45F 2200/0525* (2013.01)

(58) Field of Classification Search
CPC .. H04B 1/3877; A45F 5/00; A45F 2200/0516; A45F 2200/0525; H04M 1/04
See application file for complete search history.

(56) References Cited

U.S. PATENT DOCUMENTS

| | | | |
|---|---|---|---|
| 1,405,221 | A | 1/1922 | Jenkins |
| 2,323,148 | A | 6/1943 | McLaughlin |
| 2,510,634 | A | 6/1950 | Hull |
| 2,517,435 | A | 8/1950 | Otto |
| 2,766,909 | A | 10/1956 | Doyle |
| 2,888,617 | A | 5/1959 | Baumet |
| 3,556,341 | A | 1/1971 | Rains |
| 4,024,588 | A | 5/1977 | Janssen et al. |

(Continued)

FOREIGN PATENT DOCUMENTS

| | | |
|---|---|---|
| AU | 2012298606 B2 | 9/2017 |
| JP | 2009520220 A | 5/2009 |
| KR | 200193406 Y1 | 8/2000 |

OTHER PUBLICATIONS

"Amazon's Miracles Universal Bike Phone Mount", 2019, pp. 1-2.

(Continued)

*Primary Examiner* — Ankur Jain
(74) *Attorney, Agent, or Firm* — Holzer Patel Drennan

(57) ABSTRACT

Modular mounting systems for supportably engagement of one or more devices. The systems may include corresponding attachment members and carrier members for selective supportive engagement of one or more devices relative to a base. The attachment members and carrier members may be magnetically engageable. Various form factors for devices, base members, carrier members, attachment members, and other portions of the system are described.

11 Claims, 19 Drawing Sheets

(56) References Cited

U.S. PATENT DOCUMENTS

| | | |
|---|---|---|
| 4,066,231 A | 1/1978 | Bahner et al. |
| 4,160,285 A | 7/1979 | Shibla |
| 4,492,036 A | 1/1985 | Beckwith |
| 4,719,549 A | 1/1988 | Apel |
| 4,941,638 A | 7/1990 | Disalvatore |
| 4,967,323 A | 10/1990 | Johnson et al. |
| 5,025,966 A | 6/1991 | Potter |
| 5,067,834 A | 11/1991 | Szmanda et al. |
| 5,755,526 A | 5/1998 | Stanevich |
| 6,076,790 A | 6/2000 | Richter |
| 6,130,790 A | 10/2000 | Tu |
| 6,135,408 A | 10/2000 | Richter |
| 6,282,760 B1 | 9/2001 | Mars |
| 6,305,656 B1 | 10/2001 | Wemyss |
| 6,350,076 B1 | 2/2002 | Wagner et al. |
| 6,502,727 B1 | 1/2003 | Decoteau |
| 6,537,199 B1 | 3/2003 | Mueller et al. |
| 7,163,181 B2 | 1/2007 | Omps |
| 7,182,301 B1 | 2/2007 | Oddsen et al. |
| 7,344,320 B2 | 3/2008 | Barker et al. |
| 7,522,047 B2 | 4/2009 | Belden et al. |
| D591,756 S | 5/2009 | Wohlford et al. |
| 7,556,228 B2 | 7/2009 | Liow et al. |
| 7,621,492 B2 | 11/2009 | Omps |
| 7,686,287 B2 | 3/2010 | Dixon et al. |
| D625,302 S | 10/2010 | Kasuga et al. |
| D628,143 S | 11/2010 | Riddiford |
| 7,905,667 B2 | 3/2011 | Barker |
| 7,909,521 B2 | 3/2011 | Son |
| 8,081,432 B2 | 12/2011 | Li et al. |
| D657,783 S | 4/2012 | Mo |
| 8,238,086 B2 | 8/2012 | Ou |
| RE43,806 E | 11/2012 | Carnevali |
| D671,110 S | 11/2012 | Choi |
| D672,782 S | 12/2012 | Gross |
| 8,368,494 B2 | 2/2013 | Fiedler |
| D682,281 S | 5/2013 | Barnard et al. |
| D692,900 S | 11/2013 | Kovacs |
| D696,673 S | 12/2013 | Vogel |
| D696,674 S | 12/2013 | Vogel |
| 8,602,376 B2 | 12/2013 | Vogel et al. |
| 8,602,379 B2 | 12/2013 | Laney et al. |
| D703,677 S | 4/2014 | Bigazzi et al. |
| 8,900,009 B2 | 12/2014 | Hornick et al. |
| D723,573 S | 3/2015 | Padro |
| D731,496 S | 6/2015 | Voorhees |
| D731,497 S | 6/2015 | Xiang et al. |
| D733,116 S | 6/2015 | Aspinall et al. |
| D734,746 S | 7/2015 | Vogel |
| 9,991,922 B2 | 6/2018 | Kovacs |
| 10,756,773 B2 | 8/2020 | Kovacs |
| 11,532,952 B2 * | 12/2022 | Kovacs ............... H02J 50/10 |
| 11,717,076 B1 * | 8/2023 | Franz ................ A45F 5/00 224/222 |
| 11,783,020 B1 * | 10/2023 | Johnson ............ H04W 4/80 726/19 |
| 11,805,392 B2 * | 10/2023 | Meyer ............... H04W 4/023 |
| 11,811,169 B2 * | 11/2023 | Wei ................... F16M 11/043 |
| 11,816,199 B1 * | 11/2023 | Mortensen ........ G06F 21/40 |
| 11,880,626 B2 * | 1/2024 | Hinckley .......... G06F 3/041 |
| 11,902,869 B2 * | 2/2024 | Suzuki .............. H04W 4/80 |
| 2001/0035479 A1 | 11/2001 | Roebuck |
| 2004/0118985 A1 | 6/2004 | Omps |
| 2004/0232291 A1 | 11/2004 | Carnevali |
| 2005/0088812 A1 | 4/2005 | Hillman et al. |
| 2005/0247845 A1 | 11/2005 | Li et al. |
| 2005/0265711 A1 | 12/2005 | Heibel |
| 2006/0149386 A1 | 7/2006 | Clarke et al. |
| 2007/0014084 A1 | 1/2007 | Jobs et al. |
| 2007/0099469 A1 | 5/2007 | Sorensen |
| 2007/0114346 A1 | 5/2007 | Omps |
| 2007/0201197 A1 | 8/2007 | Hillman et al. |
| 2008/0017764 A1 | 1/2008 | Nan |
| 2008/0054541 A1 | 3/2008 | Dixon et al. |
| 2008/0099469 A1 | 5/2008 | Loveless et al. |
| 2008/0142649 A1 | 6/2008 | Lu et al. |
| 2009/0146033 A1 | 6/2009 | Chiang |
| 2009/0196597 A1 | 8/2009 | Messinger et al. |
| 2009/0229160 A1 | 9/2009 | Elliott et al. |
| 2010/0183179 A1 | 7/2010 | Griffin et al. |
| 2010/0193649 A1 | 8/2010 | Wiegers |
| 2010/0237206 A1 | 9/2010 | Barker |
| 2010/0246199 A1 | 9/2010 | Ma et al. |
| 2011/0014378 A1 | 1/2011 | Bussan et al. |
| 2011/0039424 A1 | 2/2011 | Di |
| 2011/0070825 A1 | 3/2011 | Griffin et al. |
| 2011/0139947 A1 | 6/2011 | Lee et al. |
| 2011/0148352 A1 | 6/2011 | Wang et al. |
| 2011/0192857 A1 | 8/2011 | Rothbaum et al. |
| 2011/0297566 A1 | 12/2011 | Gallagher et al. |
| 2012/0252543 A1 | 10/2012 | Cho |
| 2012/0273630 A1 | 11/2012 | Gillespie-Brown et al. |
| 2013/0068915 A1 | 3/2013 | Yang |
| 2013/0078855 A1 | 3/2013 | Hornick et al. |
| 2013/0161473 A1 | 6/2013 | Gandiboyina |
| 2014/0084119 A1 | 3/2014 | Frias |
| 2015/0048237 A1 | 2/2015 | Vogel et al. |
| 2015/0091500 A1 | 4/2015 | Claudepierre |
| 2015/0201723 A1 | 7/2015 | Rayner et al. |
| 2015/0239285 A1 | 8/2015 | Romero |
| 2016/0277552 A1 | 9/2016 | Scully et al. |

OTHER PUBLICATIONS

"International Search Report and Written Opinion for International Application No. PCT/US2012/052557", Mar. 25, 2013, 11 pages.

* cited by examiner

APPARATUS AND METHOD FOR SUPPORTING AN ARTICLE

CROSS-REFERENCE TO RELATED APPLICATION

This application is a continuation of U.S. application Ser. No. 17/001,773 filed on Aug. 25, 2020, entitled "APPARATUS AND METHOD FOR SUPPORTING AN ARTICLE," which is a continuation of U.S. application Ser. No. 16/000,613 filed on Jun. 5, 2018, now U.S. Pat. No. 10,756,773 issued Aug. 25, 2020, entitled "APPARATUS AND METHOD FOR SUPPORTING AN ARTICLE," which is a continuation of U.S. application Ser. No. 14/988,217 filed on Jan. 5, 2016, now U.S. Pat. No. 9,991,922, issued Jun. 5, 2018 entitled "APPARATUS AND METHOD FOR SUPPORTING AN ARTICLE," and claims priority from U.S. Provisional Application No. 62/099,945 filed on Jan. 5, 2015, entitled "APPARATUS AND METHOD FOR SUPPORTING AN ARTICLE," the contents of which are incorporated by reference herein as if set forth in full.

BACKGROUND

As the prevalence and capabilities of mobile devices (i.e. devices having a self-contained power unit for portable, often handheld operation) continue to increase, consumers increasingly turn to mobile devices to perform the activities of daily life. For instance, mobile devices have become more powerful tools in connection with activities at work and in the home such that mobile devices are increasingly used in lieu of or in conjunction with traditional personal computers or the like.

However, in relation to many activities performed using mobile devices, the nature of such devices present difficulties in performing many tasks given the form factor many such devices take. For example, often such devices are relatively small and sleek to promote handheld use. However, many activities performed using mobile devices may be better performed without having to hold the device. In this regard, device stands, mounts, or other support apparatuses have been developed to assist in support of engagement of the device during use. One such example is described in the U.S. Pat. No. 8,900,009, which is co-owned with the present application and incorporated by reference in its entirety. Such proposed methods and apparatuses for supporting an article generally include use of a base to which devices may be attached for supportive engagement of the mobile device. While this is useful, additional development in connection with supportive devices for supporting mobile devices or the like is needed as the additional number of uses of mobile devices continues to grow.

SUMMARY

In view the foregoing, it is presently recognized that additional developments in relation to device mounts for supporting articles such as mobile computing devices may be provided to assist in the utilization of mobile devices to perform various different activities (e.g., in relation to work and home life). Accordingly, described herein are embodiments that relate to a modular approach for supportive engagement of a plurality of devices. The embodiments described herein may provide a system for supportive engagement of a plurality of devices that may be selectively engageable with the system using cooperating carrier members and attachment members provided in association with the plurality of devices. Using this modular approach, systems may be developed that are operable to support a plurality of devices including, for example, a mobile device in combination with one or more accessories related to the mobile device for a particular activity or function provided in connection with the mobile device. Further still, the modular approach to device engagement described herein may facilitate a modular approach for interchangeably engaging one or more devices with a plurality of different mounts (e.g., at different locations for use of a device in the plurality of different locations).

Furthermore, specific embodiments of mounting apparatuses are described herein that may, for example, be utilized to attach devices to a tubular support structure or the like. Such mounting apparatus may be used to provide a carrier member in a mounting system that may be used in selective supportive engagement of one or more articles in relation to the tubular support structure to which the mounting apparatus is secured. Such mounting apparatus may be particularly useful for positioning a carrier member for selective supporting engagement of devices to be mounted in relation to tubular structures such as, for example, in the context of a bicycle or the like.

Accordingly, a first aspect includes a mounting apparatus for supporting a device in relation to a tubular support structure. The apparatus includes a carrier member that includes a magnetic interconnect portion and a support structure engagement portion. The interconnect portion is adapted for magnetic engagement with an attachment member that is operatively associable with a device for supportive contact of the device by the carrier member when engaged with the attachment member. The apparatus also includes a strap extending from the carrier member and adapted for engagement of a tubular support structure to secure the support structure engagement portion to the tubular support structure. The attachment member includes a magnetic portion. Also, at least one of the magnetic portion of the attachment member or the magnetic interconnect portion of the carrier member comprises at least one magnet. In turn, magnetic interaction between respective ones of the magnetic portion of the attachment member and the magnetic interconnect portion of the carrier member is operable to selectively establish the supportive contact between the attachment member and the magnetic interconnect portion.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, the strap may include features that allow for selective engagement and/or disengagement of the tubular member. Accordingly, the strap may be disposable in a channel of the support structure engagement portion to secure the strap relative to the support structure engagement portion. The strap may include a plurality of notches engageable by a pawl of the support structure engagement portion to retain the strap relative to the channel of the support structure engagement portion. Accordingly, the notches and the pawl may define a ratchet interface to allow for one way passage of the strap relative to the channel. To remove the strap, the pawl may be disposed on a tongue that is displaceable from the strap to allow the strap to be selectively removed from the channel.

In an embodiment, the attachment member may be associated with a device that is supportably engaged by the carrier member upon engagement of the attachment member with the carrier member. The carrier member may comprise a magnet.

A second aspect includes a system for supportive engagement of multiple devices. The system includes a base member and a first carrier member. The first carrier member includes a first interconnect portion and a second interconnect portion. The first interconnect portion includes a surface area for conformal adjacent engagement with the base member, and at least a portion of the surface area is supportively contactable with the base member. The system also includes a first attachment member operatively associable with a first device. The first attachment member is removably attachable to the second interconnect portion of the first carrier member. In turn, the first device is supportably engageable with the second interconnect portion. The system also includes a second carrier member associable with the first device comprising a third interconnect portion. The third interconnect portion is removably attachable to a second attachment member. As such, the second attachment member is operatively associable with a second device. The second attachment member is removably attachable to the third interconnect portion of the second carrier member. As such, the second device is supportable engageable with the third interconnect portion. Accordingly, the base member, the first carrier member, the second carrier member, the first attachment member, and the second attachment member, each comprises a magnetic portion such that at least one of the magnetic portions comprise at least one magnet. In turn, magnetic interaction between respective ones of the magnetic portions is operable to selectively establish the supportive contact between the base and the surface area of the carrier member, the removable attachment of the first attachment member to the second interconnect portion, and the removable attachment of the second attachment member to the third interconnect portion.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, in an embodiment the first carrier member and the second carrier member may each comprise a magnet and each of the magnetic portions of the first attachment member and the second attachment member may comprise magnetically interactive portions attractable to respective corresponding ones of the magnet of the first carrier member and the second carrier member. In another embodiment, at least one of the first carrier member or the first attachment member is integrally provided with the first device. For instance, the first carrier member and the first attachment member may both be integrally provided with the first device. Furthermore, at least one of the second carrier member or the second attachment member is integrally provided with the second device. Additionally, the first interconnect portion and the third interconnect portion may be identical in configuration (i.e., be of the same size, shape, etc.).

Accordingly, the system may provide for modular engagement of various apparatuses. In this regard, the first device may include at least one of a speaker, a battery, a solar panel, a projector, a camera, a camera accessory, a light, a cable management device, a writing instrument holder, or a paper management device. Furthermore, the second device may include a handheld computing device. As such, the handheld computing device is in operative communication with the first device.

A third aspect includes a device for use in a modular mounting system. The device includes an first attachment member operatively associated with the device and adapted for selective magnetic engagement with a first carrier member. The device further comprises a second carrier member operatively associated with the device and adapted for selective magnetic engagement with a second attachment member. The first attachment member is operative to engage the first carrier member to supportively engage the device using the first carrier member, and wherein the second carrier member is operative to supportably engage the second attachment member to supportably engage a second device operatively associated with the second attachment member.

A number of feature refinements and additional features are applicable to the third aspect. These feature refinements and additional features may be used individually or in any combination. As such, each of the following features that will be discussed may be, but are not required to be, used with any other feature or combination of features of the third aspect.

For example, the first carrier member and the second carrier member each have an interconnect portion of substantially identical configuration.

A fourth aspect includes a kit associated with a device mounting system. The kit includes a first base member having a first interconnect portion for magnetic interaction with an attachment member. The kit further includes a second base member having a second interconnect portion for magnetic interaction with an attachment member. Additionally, the kit includes an attachment member that is operatively associable with a device for selective supportive engagement by the first base member or the second base member.

A number of feature refinements and additional features are applicable to the fourth aspect. These feature refinements and additional features may be used individually or in any combination. As such, each of the following features that will be discussed may be, but are not required to be, used with any other feature or combination of features of the fourth aspect.

For instance, the first interconnect portion and the second interconnect portion are of substantially identical configuration.

DETAILED DESCRIPTION

Figure 1A:
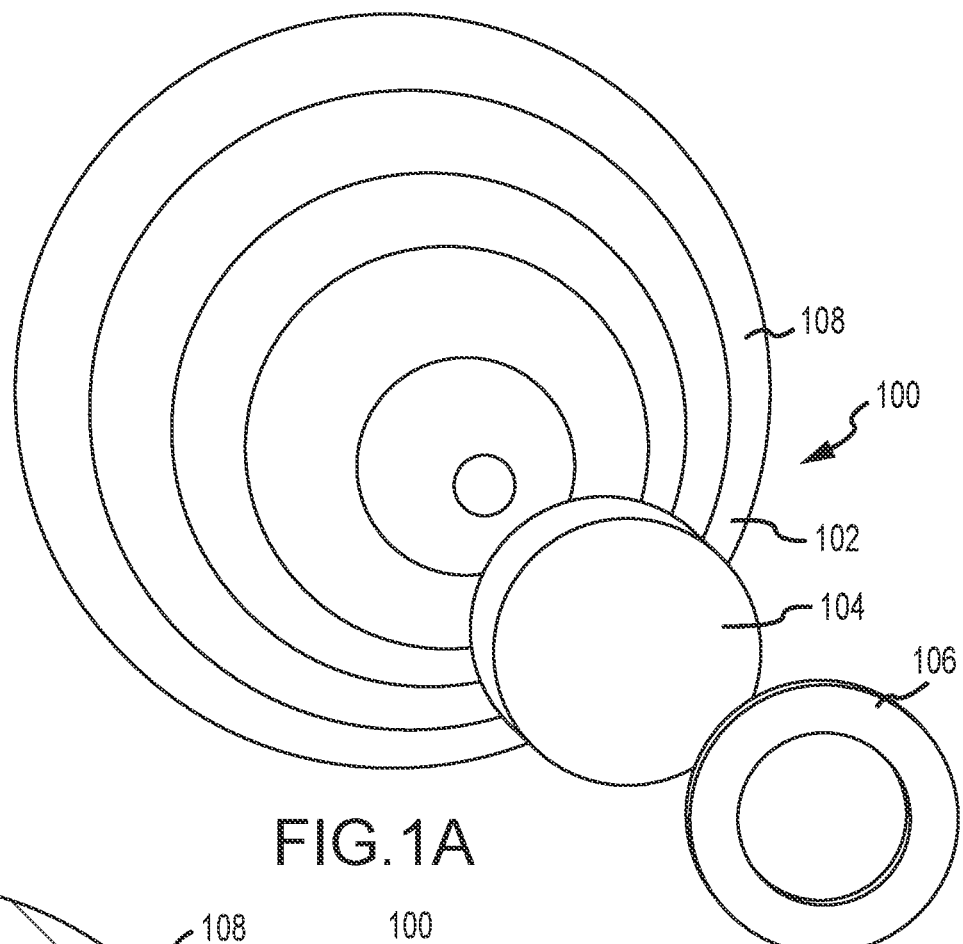
FIG. 1A depicts a perspective view of an embodiment of mounting system in an exploded state.
Figure 1B:
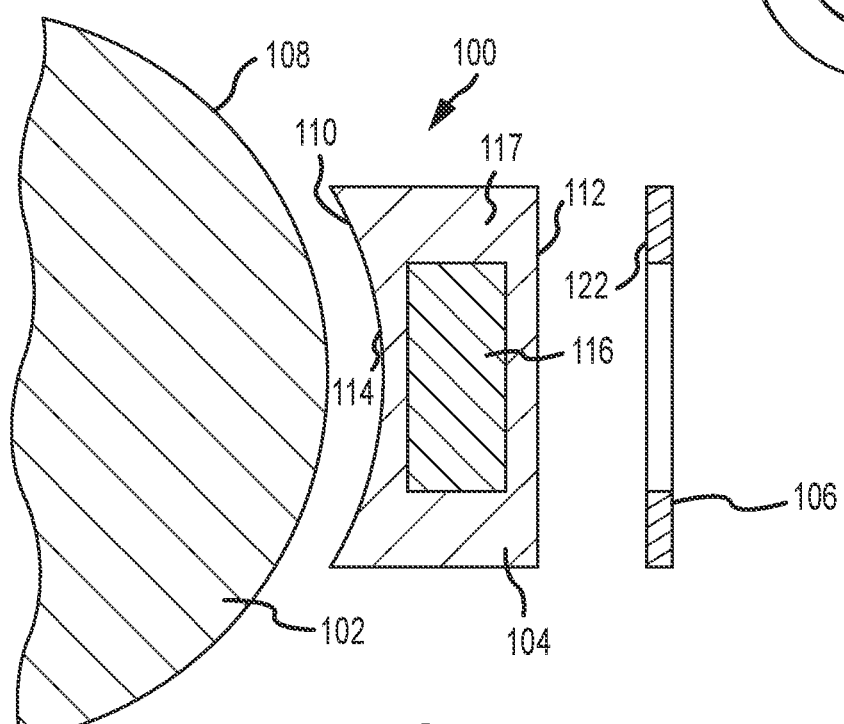
FIG. 1B depicts a side view of an embodiment of a mounting system in an exploded state.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

The present disclosure generally relates to embodiments for mounting articles or devices such as mobile devices including, for example, portable electronic devices such as smartphones, tablet computers, or the like. However, the embodiments described herein may be utilized in conjunction with any other device or apparatus to be mounted including, for example, computers, monitors, displays, pictures, televisions, sound systems, speakers, GPS devices, e-book readers, laptops, netbooks, tablets, or any other appropriate device or article. Additionally, an article supported by the embodiments of mount systems may be a non-electronic device or article such as a photo, poster, piece of art, or other appropriate article to be physically supported. In particular, described herein is a modular approach to device mounting for supportably engaging a device such that a plurality of devices may be supportably engaged relative to a base. In this regard, each of the plurality of devices supportably engaged relative to the base may be provided or associated with coordinating members for selective supportive engagement. The coordinating members may comprise magnetic portions. In turn, at least one of the coordinating magnetic portions of the devices to be supportably engaged may include a magnet to facilitate magnetic engagement between the coordinating magnetic portions of the devices to be supportably engaged relative to the base.

In this regard, a plurality of devices may be supportably engaged as "stacks" whereby a plurality of devices that are supportively engaged by way of the coordinating members may define the stack. In this regard, stacks of devices may be provided informed for performing a particular task. For example, during a presentation, a mobile device executing a program for presentation, one or more speakers, a projector, or other devices that may assist in the presentation may be provided to form a stack that may be supported by a base for use during the presentation. As may be appreciated, each of the devices provided in the stack may be supportably engaged by way of the coordinating members comprising magnetic portions for magnetic engagement between the devices. Other stacks may be provided for different tasks whereby the devices provided in the stack maybes particularly selected for the task.

Furthermore, the embodiments described herein also facilitate a modular approach for device mounting whereby a device may be fitted with a given attachment member for utilization with a plurality of different bases. In this regard, mounting systems may be facilitated whereby one or more different devices may be supportably engageable with a plurality of different bases (e.g., different locations). One or more different mobile devices may be utilized with a plurality of bases. Accordingly, a device may be interchangeably utilized with different bases in different contexts. For example, a given device may be supportably engaged by a base in a first location (e.g., a kitchen), and thereafter moved to a second location (e.g., a living room) for supportive engagement with a different base.

Further still, the present disclosure further includes embodiments directed to a particular base member that be used to mount the device to a tubular support structure. The base member may include a carrier member for utilization in conjunction with a mounting system as described herein. In one particular nonlimiting example, the tubular support structure may comprise one or more components of a bicycle or the like. In this regard, the base member may include an engagement structure (e.g., carrier member) that is secured relative to the tubular support structure. In turn, a device may be securely engaged to the mounting device utilizing coordinated corresponding members (e.g., magnetically interactive attachment and carrier members) that may provide for supportable engagement of a device.

FIGS. 1A-2B depict an embodiment of a mounting system 100 that may be utilized by embodiments described herein. The mounting system 100 generally includes a base member 102. As depicted in FIGS. 1A-2B, the base member 102 may comprise a base member. However, other embodiments be provided including a base member 102 that integrates a carrier member 104. In this regard, the system 100 further includes a carrier member 104 and an attachment member 106. The attachment member 106 is operatively associable with a device to be supportably engaged by the mounting system 100. In turn, the attachment member 106 is removably attachable to the carrier member 104 and the carrier member 104 is supportably engageable with the base member 102. The attachment of the carrier member 104 to the base member 102 as well as the attachment member 106 to the carrier member 104 may be facilitated by way of magnetic interaction between the elements. In this regard, a device associated with the attachment member 106 may be supportably engaged by the mounting system 100 by supportive engagement with the carrier member 104 that is in turn engaged with the base member 102.

The base member 102 may be supportably engageable with a substrate (not shown in FIGS. 1A-2B). For example, the base member 102 may be rigidly mounted to a surface or may be disposed on a surface that supportably engages the base member 102 (e.g., on a stem or the like). Additionally, other base members 102 that do not include a base member 102 may be provided as discussed in greater detail below. The base member 102 may include a convexly curved surface area 108. At least a portion of the convexly curved surface area 108 is unobstructed. That is, the convexly curved surface area 108 includes at least a portion that is not obstructed when the base member 102 is supportively engaged with a base. As shown in FIGS. 1A-2B, the convexly curved surface area 108 may comprise at least a portion of a spherical surface. Alternative embodiments include a convexly curved surface area of any appropriate shape or contour (e.g., an ovoid or the like).

As stated above, the carrier member 104 is supportively contactable with the base member 102. In this regard, the carrier member 104 includes a first interconnect portion 110 that is adapted for supportive engagement with the base member 102. The first interconnect portion 110 includes a concave surface area 114 that is shaped for conformal adjacent engagement with the convexly curved surface area 108. The concave surface area 114 of the first interconnect portion 110 is also adapted for selective positioning through a continuum of positions defined on the convexly curved surface area 108. For example, the first interconnect portion 110 may be positioned throughout the unobstructed portion of the convexly curved surface area 108.

The concave surface area 114 may, for example, be adapted for conformal surface to surface contact across substantially all of the concave surface area 114 of the first interconnect portion 110 of the carrier member 104. As such, the radius of curvature of the concave surface area 114 may be substantially the same as the radius of curvature of the convexly curved surface area 108 along at least a portion of the convexly curved surface area 108. In this regard, when the carrier member 104 is in supportive contact with the base member 102, substantially all of the concave surface area 114 may be in surface to surface contact with a portion of the convexly curved surface area 108. Alternatively, at least a portion of the first interconnect portion 110 such as a portion of the convexly curved surface area 108 may be in conforming contact with the convexly curved surface area 108. For example, a rim portion extending about a circumference of the carrier member 104 may contact the convexly curved surface area 108.

The carrier member 104 also includes a second interconnect portion 112. The second interconnect portion 112 is adapted for contact with the attachment member 106 to facilitate the removable attachment of the attachment member 106 to the carrier member 104. The first interconnect portion 110 and the second interconnect portion 112 may be disposed on opposite end portions of the carrier member 104. As such, when the first interconnect portion 110 is supportively engaged with the base member 102, the second interconnect portion 112 may face radially outward from the convexly curved surface area 108.

In an embodiment, the second interconnect portion 112 may be substantially planar. In this regard, the attachment member 106 may include a corresponding planar surface 122 for contact with the second interconnect portion 112. In the embodiments depicted in FIGS. 1A-2B, the attachment member 106 may comprise an annular disk. In additional embodiments, the attachment member 106 may take additional forms (e.g., a solid circular disk, a polygon shape, etc.). The attachment member 106 may be of a shape corresponding to the shape of the second interconnect portion 112. Alternatively, the attachment member 106 may have a shape different than that of the second interconnect portion 112. For example, at least a portion of the attachment member 106 may overhang (i.e., extend beyond) the second interconnect portion 112 or at least a portion of the second interconnect portion 112 may overhang (i.e., extend beyond) the attachment member 106 when the carrier member 104 is in contact with the attachment member 106.

As stated above, the attachment member 106 is operatively associable with a device or other object that is to be supportively engaged by the mounting system 100. The attachment member 106 may be associated with (e.g., attached to), the device in any manner known in the art. For example, the attachment member 106 may be integrated with the device, associated with a cover attachable to a device, bonded to a device (e.g., by way of adhesives or the like), mechanically interconnected to the device, or otherwise associated with the device. In any regard, the attachment member 106 is capable of supporting the device when the attachment member 106 is attached to the carrier member 104. In this regard, when the attachment member 106 is attached to the second interconnect portion 112 of the carrier member 104, the device with which the attachment member 106 is associated may be supported.

Additionally, it will be noted that multiple attachment members 106 may be provided with respective ones of a plurality of different devices. In this regard, the attachment members 106 for each device may be operative to be removably connected to the carrier member 104. As such, the base member 102 and carrier member 104 may be used in conjunction with one of the attachment members 106 and devices such that the various devices that are associated with an attachment member 106 may be interchangeably attached to the carrier member 104.

As mentioned above, the supportive contact between the base member 102 and the carrier member 104 as well as the removable contact between the carrier member 104 and the attachment member 106 may be provided by way of magnetic interaction between respective magnetic portions of the base member 102, carrier member 104, and attachment member 106. The magnetic portions of the base member 102, the carrier member 104, and the attachment member 106 may be discrete portions provided on each of the members, or may comprise substantially the entire element (e.g., the element may be made from a magnetically interactive material such as a ferromagnetic material). One or more of the magnetic portions of the base member 102, carrier member 104, and attachment member 106 may comprise at least one magnet. The others of the magnetic portions of the base member 102, carrier member 104, and attachment member 106 may be magnetically interactive such that they are attracted to the at least one magnet. In this regard, magnetic interaction between respective ones of the magnetic portions may establish the supportive contact between the base member 102 and the carrier member 104 as well as the removable attachment between the carrier member 104 and the attachment member 106.

In the embodiment depicted in FIGS. 1A-2B, the carrier member 104 includes a magnet 116. The magnet 116 may be disposed generally between the first interconnect portion 110 and the second interconnect portion 112. For example, an over-molded enclosure 117 may be formed about the magnet 116 to define the features of the carrier member 104 discussed above (e.g., the first interconnect portion 110, the second interconnect portion 112, etc.). The carrier member 104 may be of a one piece construction or comprise multiple pieces. For example, the carrier member 104 may consist essentially of a magnet 116 and include the structural features of the carrier member 104 described above. In an implementation, the enclosure 117 may be provided about the magnet 116 such that the enclosure 117 defines one or more of the structural features of the carrier member 104 described above. In any regard, the magnet 116 may be operative to produce a magnetic field at both the first interconnect portion 110 and the second interconnect portion 112. The base member 102 and the attachment member 106 may be constructed from or include a magnetically interactive material. As such, the base member 102 may be magnetically attracted to the first interconnect portion 110 and the attachment member 106 may be attracted to the second interconnect portion 112. In this regard, the magnet 116 may interact with the base member 102 to establish the supportive contact between the base member 102 and the carrier member 104. Additionally, the magnet 116 may establish the removable attachment of the attachment member 106 with the carrier member 104 by way of magnetic interaction between the magnet 116 and the attachment member 106.

Figure 2A:
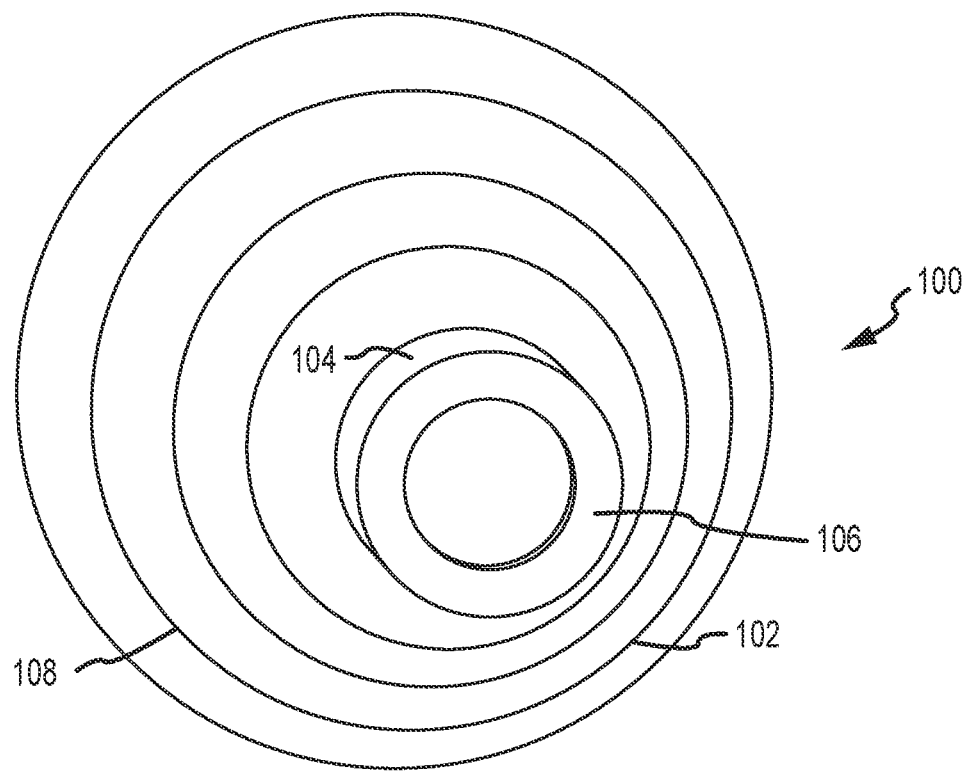
FIG. 2A depicts a perspective view of an embodiment of a mounting system with various components thereof attached.
Figure 2B:
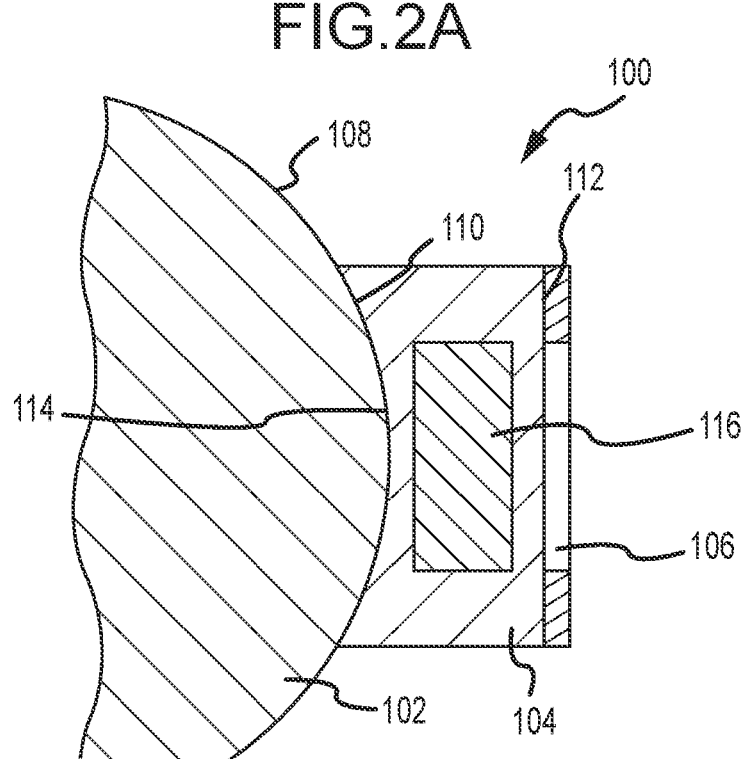
FIG. 2B depicts a side view of an embodiment of a mounting system with various components thereof attached.
Figure 3:
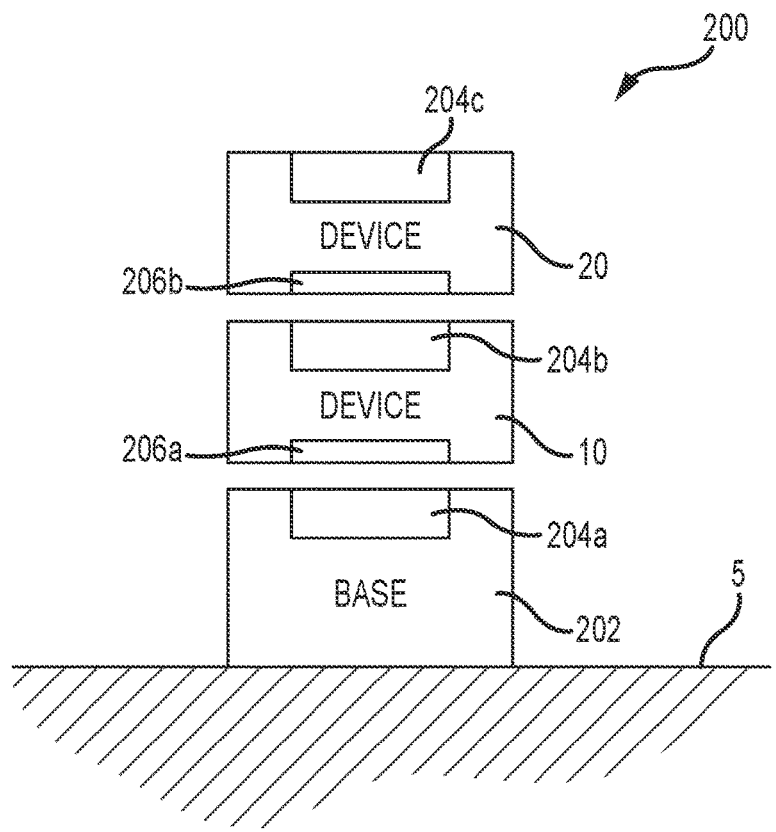
FIG. 3 depicts an embodiment of a modular system for attachment of a plurality of devices.

Turning now to FIG. 3, an embodiment of a mounting system 200 for modular mounting of one or more devices is depicted. As will be appreciated and the discussion that follows, the system 200 may generally utilize cooperative magnetic interaction between attachment members 206 and carrier members 204 for selective supportive engagement of one or more devices by way of magnetic interaction between the attachment members and carrier members in a manner similar to that described above in connection with FIGS. 1A-2B. In this regard, the system 200 may generally utilize structures corresponding to the carrier member and attachment members as described in U.S. Pat. No. 8,900,009, which is incorporated by reference herein in co-owned with the present application. Note specifically that given any attachment member of the system 200 may be used in conjunction with any particular carrier member of the system 200, the system 200 may provide a wide variety of flexibility with regard to the number and/or manner in which devices may be supported as described in greater detail below. For instance, a given device having an attachment member 206 may be connected to any given other device or base having a carrier member 204. Furthermore, the devices may be sequentially connected using coordinating carrier members 204 and attachment members 206 such that the devices are attached in any given order appropriate based on the configuration of the attachment member 206 relative to the carrier member 204.

With further specific reference to FIG. 3, the system 200 may include a base member 202 that is fixedly supported in relation to a substrate 5. As may be appreciated, the substrate 5 may be a surface upon which the base member 202 is resting, a tubular support structure, or other structure to which the base member 200 may be affixed and/or attached. That is, the depiction of the substrate 5 and base member 202 is provided in a schematic for illustrative purposes only. In this regard, the base member may be provided on a vertical side of a substrate 5 and/or supported or attached to a horizontal side of the substrate 5. In this regard, the base member 202 may include any appropriate attachment structure that fixedly engages the substrate 5 (e.g., including a fastener connection, a clamping connection, resting upon a surface, or any other supportive engagement). Additionally or alternatively, the base member 202 may include a platform that supportably engages the substrate 5 (e.g., the base member 202 may simply rest on the substrate 5 and include a suitable platform to supportably engage the base 202 and/or devices supported thereby).

The base member 202 may include a first carrier member 204a. The first carrier member 204a may comprise a magnetic portion as described above in connection with the carrier member 104 described in connection with FIGS. 1A-2B. The first carrier member 204a may be fixedly provided relative to the base member 202 and/or maybe positionable relative to the base member 202. As may be appreciated, the base member 202 may include a bulbous member and the first carrier member 204a may correspond to a carrier member 104 as described above that allows for positioning of the carrier member 104 throughout a continuum of positions relative to the convex surface area 108. However, the first carrier member 204a may be otherwise positionable relative to the base member 202 (e.g., the first carrier member 204a may slide, pivot, rotate, or otherwise move relative to the base member 202) and/or may be provided in fix relation relative to the base 202.

In any regard, the first carrier member 204a may be operative to supportably engage a first device 10. In this regard, the first device 10 may include a first attachment member 206a. The first attachment member 206a may include a magnetic portion as described above in relation to the attachment member 106. For example, the first attachment member 206 a may comprise a ferrous material that is influenced by a magnetic field. In this regard, the first attachment member 206a and the first carrier member 204a may be selectively engageable for supportive engagement of the device 10 first by the carrier member 204a upon magnetic interaction between the first attachment member 206a and the first carrier member 204a.

As may be appreciated in FIG. 3, the first device 10 may further be associated with a second carrier member 204b. The second carrier member 204b may also comprise a magnetic portion as described above in connection with carrier member 104. The second carrier member 204b may be positioned fixedly or movably relative to the device 10. For example, the second carrier member 204b may be integrated with the first device 10, attached to the first device 10 by way of adhesive, mechanically interconnected to the first device 10, or otherwise associated with the first device 10. In any regard, the second carrier member 204b may be operative to engage a second attachment member 206b that may be associated with a second device 20. In this regard, the second device 20 may be supportably engaged by the second carrier member 204b of the first device 10 by way of interaction between the second attachment member 206b and the second carrier member 204b. In this regard, the first device 10 and second device 20 may be collectively supportably engaged by the base 202 such that the first device 10 and second device 20 comprise a "stack" of devices that may be collectively supported by the system 200.

Additionally, while not shown in FIG. 3, one or more additional devices that include an additional attachment member 206 may be provided that may engage a third carrier member 204c associated with the second device 20. In this regard, while two devices 10 and 20 are shown in FIG. 3, additional devices may also be provided for similar selective supportive engagement as that discussed above in connection with the first device 10 and the second device 20. Furthermore, while the second device 20 is shown as having a third carrier member 204c, it may be the case that the second device 20 is only associated with an attachment member 206 such that no further device may be supportably engaged relative to the second device 20. However in the case where the second device 20 does include a third carrier member 204c another device having an attachment member 206 may be provided such that the device may be selectively supportably engageable with the third carrier member 204c of the system 200. As may be appreciated, provision of additional devices having attachment members 206 and carrier members 204 may facilitate connection of any number of additional devices in the device stack. Accordingly, the system 200 forms a modular mounting system that may be utilized to mount one or more different devices (e.g., first device 10, second device 20, etc.) to a base member 202.

Of note, any of the attachment members 206 of the system 200 may engage any respective one of the carrier members 204. In this regard, the devices 10 and 20 may be interchangeably used together or individually with the base 202 without limitation. Furthermore, the order in which devices are provided in the device stack may be altered. That is, given the cooperative interaction between corresponding attachment members 206 and carrier members 204, devices may be used in any combination and any device having an attachment member 206 may be supportably engaged by any other device having a carrier member 204.

Figure 4:
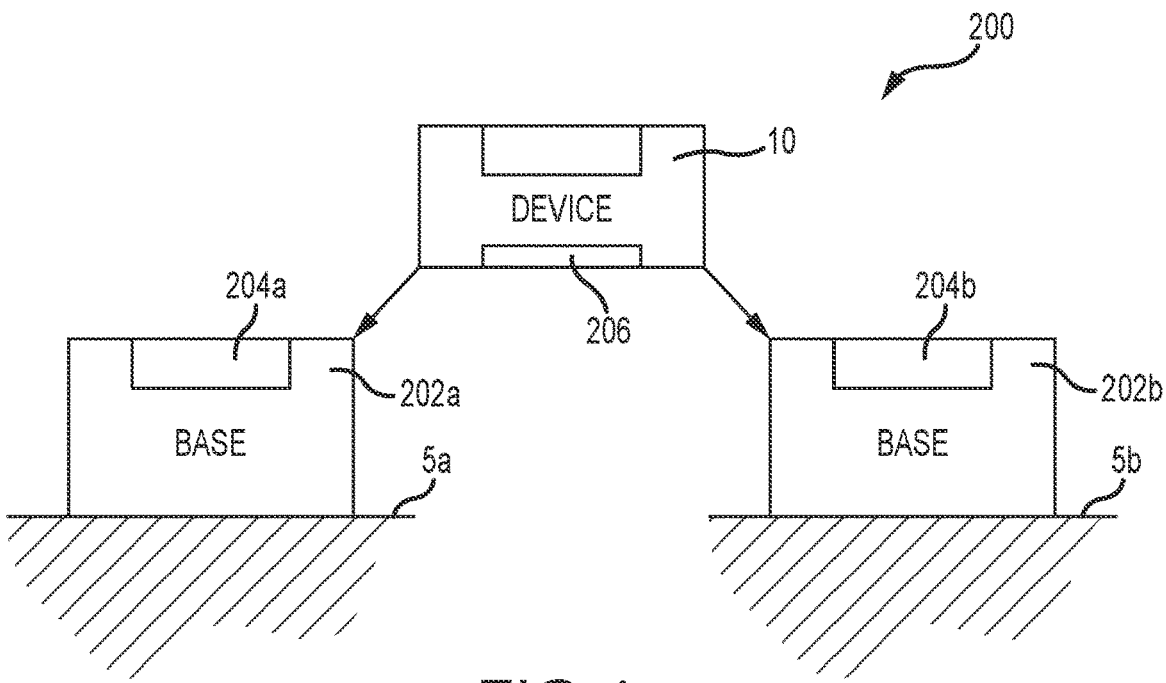
FIG. 4 depicts use of an embodiment of a modular system for support of a device at a plurality of locations.

This concept of interchangeability of various devices and bases is further illustrated in FIG. 4 which depicts a first base member 202a and a second base member 202b. As may be appreciated, the first base member 202a may be attached or affixed to a first substrate 5a, and the second base member 202b may be attached or affixed to a second substrate 5b. The first substrate 5a and the second substrate 5b may comprise different portions of a single supporting structure or may comprise wholly different supporting structures (e.g., provided in different locations or settings). In any regard, the first base member 202a may include a first carrier member 204a. The second base member 202b may include a second carrier member 204b. Accordingly, a device 10 may be provided that is associated with an attachment member 206. As may be appreciated, the attachment member 206 may be configured for selective supportive engagement (e.g., magnetic engagement) with either the first carrier member 204a or the second carrier member 204b. Accordingly, as depicted in FIG. 4, the device 10 may be selectively supported by either the first carrier member 204a of the first base member 202a or the second carrier member 204b of the second base member 202b. For instance, the device 10 may be utilized interchangeably with either the first base member 202a or the second base member 202b. Furthermore, the device 10, will not shown as having an additional carrier member 204 in FIG. 3, may in fact include an additional carrier member 204 for supportive engagement of a stack of devices.

As way of example, the first base member 202a may be provided in a first location and the second base member 202b may be provided in a second location. In turn, a user of the device 10 may engage the device 10 by way of cooperative interaction between magnetic portions of the attachment member 206 and the first carrier member 204a of the first base 202a in a first instance at the first location. In this regard, the user of the device 10 may utilize the device while supported by the first base member 202a. At a different time, the user may remove the device 10 from the first base member 202a and relocate the device 10 to the second base member 202b at a second location. In this regard, the device 10 may be supportably engageable with the second carrier member 204b of the second base member 202b in a second instance. Additionally, in the event that a device stack is provided, the entire device stack may be moved from a first location the second location. Alternatively, portions of the device stack (i.e. one or more devices) may be moved to be used at a different location. As such, the modular design may be provided such that the device may be utilized in a plurality of different locations in a plurality of different instances.

One such particular example where the approach facilitated by the system shown in FIG. 2 may be advantageous is in the context of supportive engagement of a smartphone or tablet computing device. In this specific example, the device 10 may comprise a smartphone or tablet computing device having attachment member 206 associated therewith. For example, the device 10 may have an attachment member 206 integrated therewith or may have the attachment member 206 associated with the device 10. In any regard, the first base member 202a may be provided in the first location within a user's home such as, for example, the kitchen. In this regard, the user may engage the device 10 with the first base member 202a in the kitchen at a first instance when utilizing the device 10 for a first given task such as during cooking. The second base member 202b may be provided in a different location within the user's house such as, for example, the user's bedroom or living room. In this regard, when the user desires to use the device 10 during a second instance for a second task (e.g., watching a movie), the user may move the device 10 to the second base member 202b for supportive engagement there with when utilizing the device 10 to watch the movie.

Figure 5:
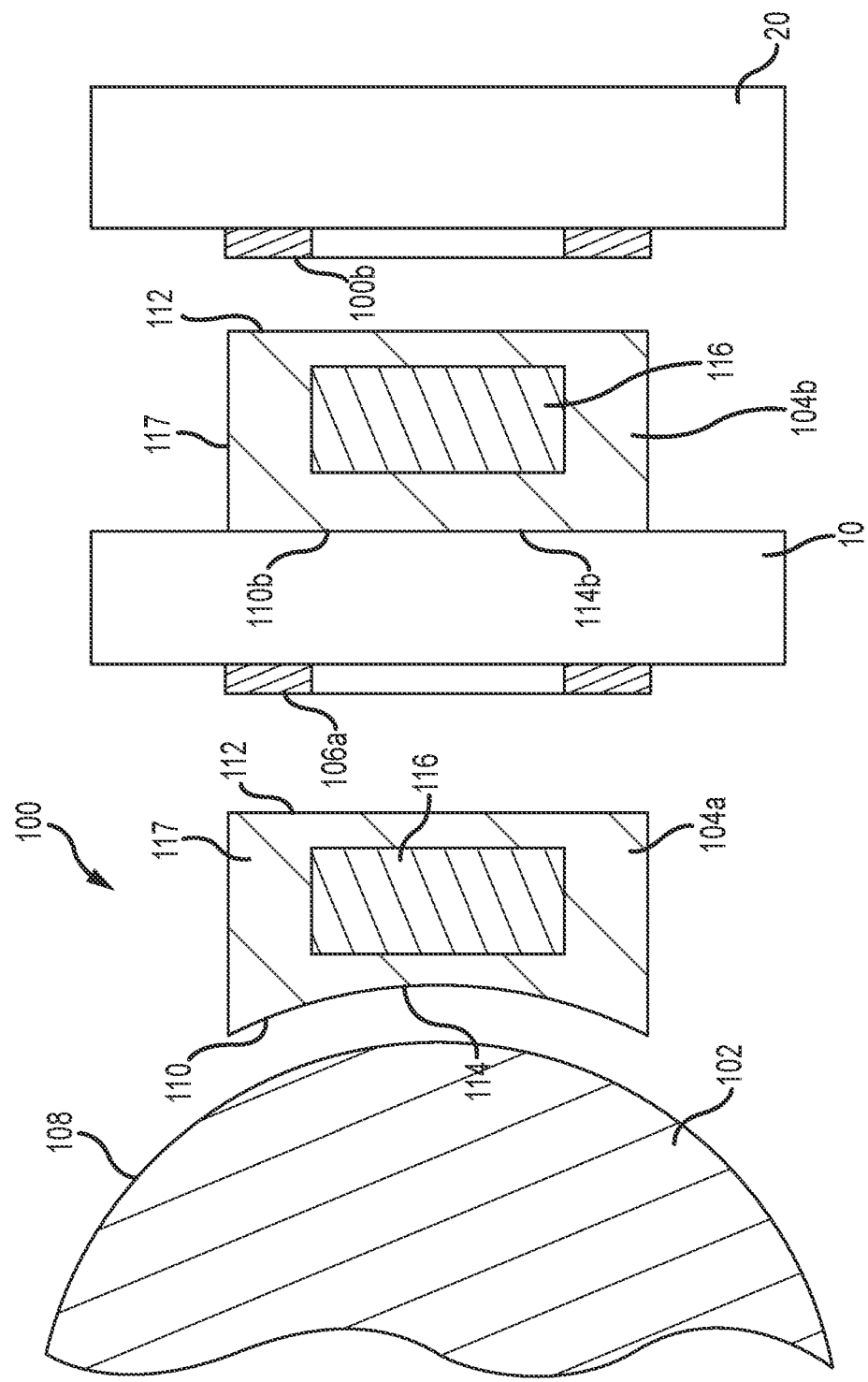
FIG. 5 depicts a side view of an embodiment of a system for support of a plurality of devices in an exploded configuration.
Figure 6:
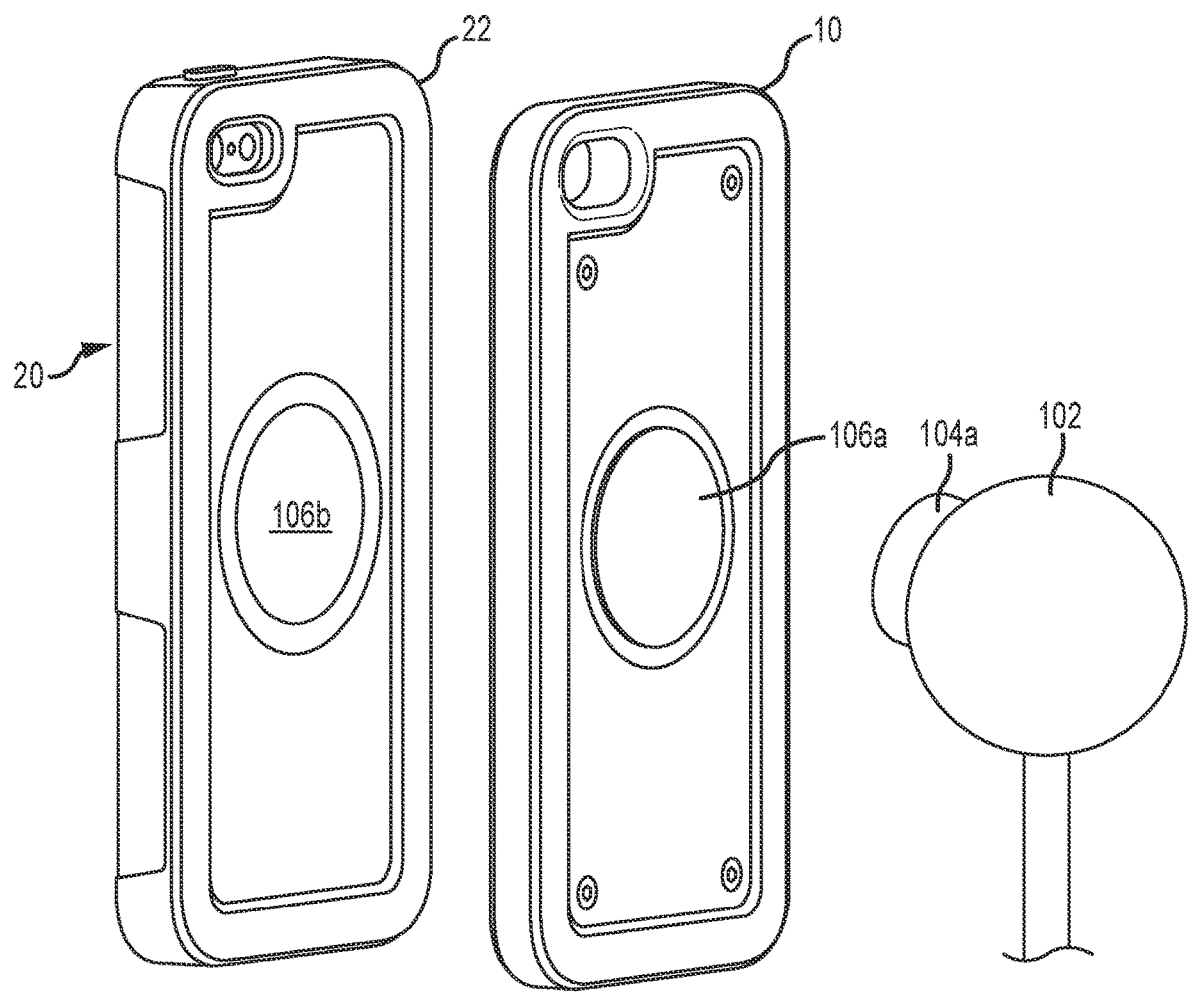
FIGS. 6-7 depict perspective views of an embodiment of a system for support of a plurality of devices in an exploded configuration.

FIG. 5 depicts a further application of the embodiment of the system 100 that may utilize modular approach to supporting a plurality of devices as described in FIG. 3. Accordingly, a base member 102 and a first carrier member 104a may be provided as described above in connection with FIGS. 1A-2B. FIG. 5 further includes a first attachment member 106a as described above. FIG. 3 further depicts a first device 10 and a second device 20. In this regard, the first device 10 may include the attachment member 106a as described above. The first device 10 may also include a second carrier member 104b. The second carrier member 104b may have a structure as described above in connection with the first carrier member 104a with the exception of the first interconnect portion 110. Rather than a concave surface area 114 for engagement with the convex surface area 108 of the base member 102, the first interconnect portion 110b of the carrier member 104b may be adapted to conformingly engage with the device 10. Accordingly, the first interconnect portion 110 of the carrier member 104b may be generally planar. In additional or alternative embodiments, the first interconnect portion 110 of the carrier member 104b may have any other suitable configuration for conformal engagement with the device 10 (e.g. including contoured surfaces or the like).

In any regard, the carrier member 104b may also have a second interconnect portion 112 that may further engage a second attachment member 106b that may be associated with the second device 20. In this regard, the first device 10 may be supportively engaged with the carrier member 104a that is in turn supportively engaged by the base member 102. That is, magnetic interaction between the base member 102 and the first carrier member 104a may provide supportive engagement between the elements. Furthermore, magnetic interaction between the carrier member 104a and the attachment member 106a associated with the first device 10 may provide supportive engagement of the first device 10 relative to the first carrier member 104a. Further still, the second carrier member 104b associated with the first device 10 may provide another interconnect portion 112 that may engage another attachment member 106b associated with the second device. Accordingly, a plurality of devices 10, 20 may be supportively engaged by the system 100.

In the embodiment depicted in FIGS. 6-9, the first device 10 and the second device 20 may have an identical footprint in relation to a width and height of the devices. In this regard, the width and height measurements may refer to the dimensional extent of the devices parallel to a plane defined by the attachment member 106a or 106b. That is, the first device 10 and the second device 20 may share a common horizontal and vertical footprint. Accordingly, the first device 10 may be disposed solely within the envelope of the second device 20 such that when viewed in an isometric manner, the first device 10 may not be visible behind the second device 20. The devices may have different depths depending upon the nature of the devices. For example, the first device 10 may have a greater depth or a lesser depth in the second device 20. As will be appreciated in greater detail in relation to the discussion of FIGS. 16-18 below, the devices of a given device stack may not all share the same footprint corresponding to identical width and height dimensions. However, at least some of the devices, and potentially all the devices) in a given stack may have identical footprints such that the width and height dimensions of all the devices in the stack are the same.

As may be appreciated, when an element is described as being associated with a device, it may be appreciated that the element may be configured in any appropriate manner to engage the device. For instance, the element (e.g., a carrier member and/or an attachment member) may be secured to the device by way of an adhesive. Further still, the element may be provided in connection with a case or the like that is mechanically secured to the device. The element could additionally or alternatively be integrated into a chassis of the device itself. Accordingly, an element may be associated with a device in any appropriate manner to facilitate supportive engagement of the device as described herein.

Additionally, while only the first device 10 is shown with both an attachment member 106a and carrier member 104b for supportive engagement with two other elements, it may be appreciated that additional devices having both a carrier member 104 and an attachment member 106 may be provided. As these devices may be operative to engage two other devices and/or bases, it may be appreciated that such devices may be used in conjunction with a stack of devices whereby a plurality of devices are supportably engaged by cooperative interaction between carrier members 104 and attachment members 106.

Figure 7:
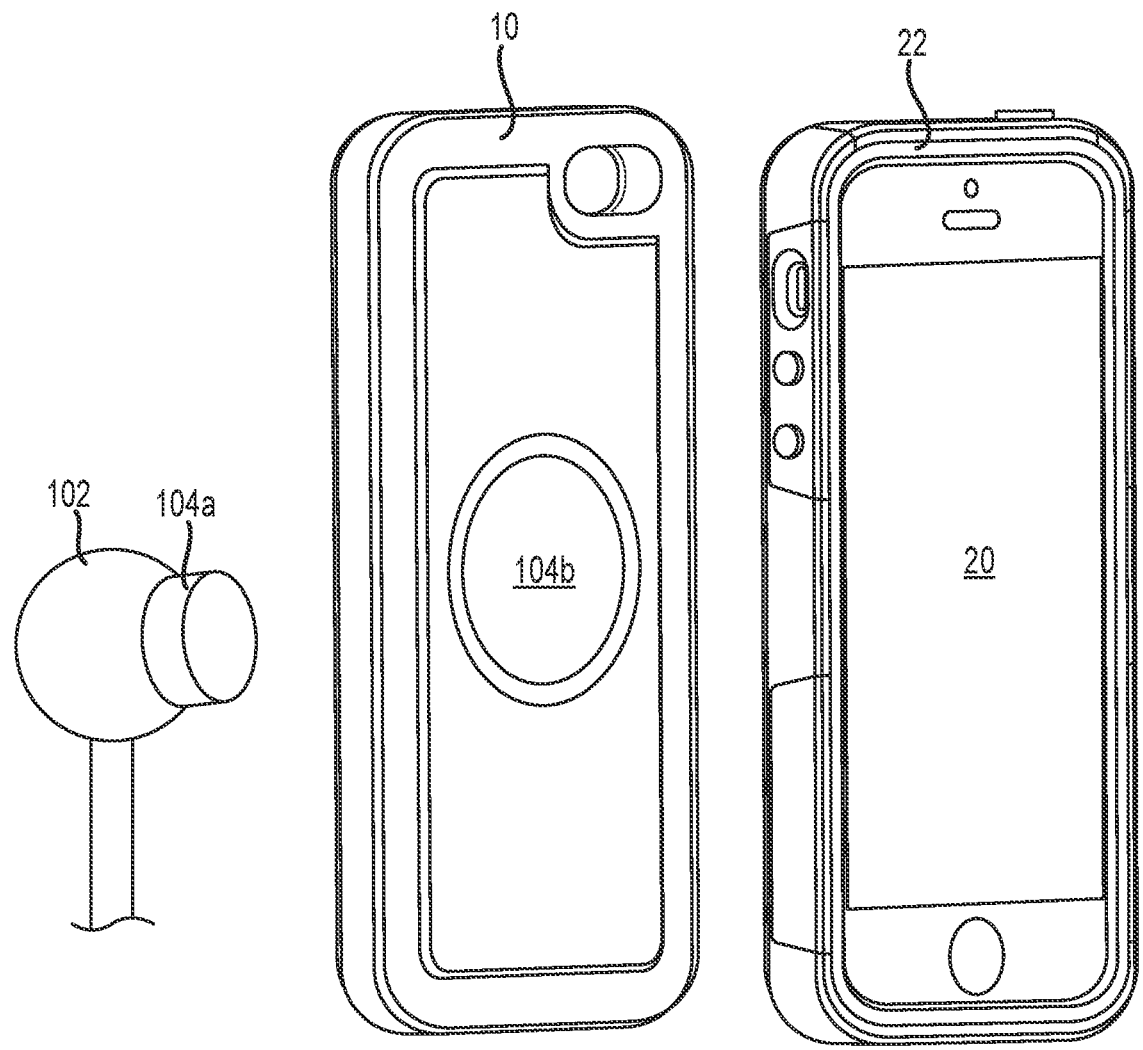
Figure 8:
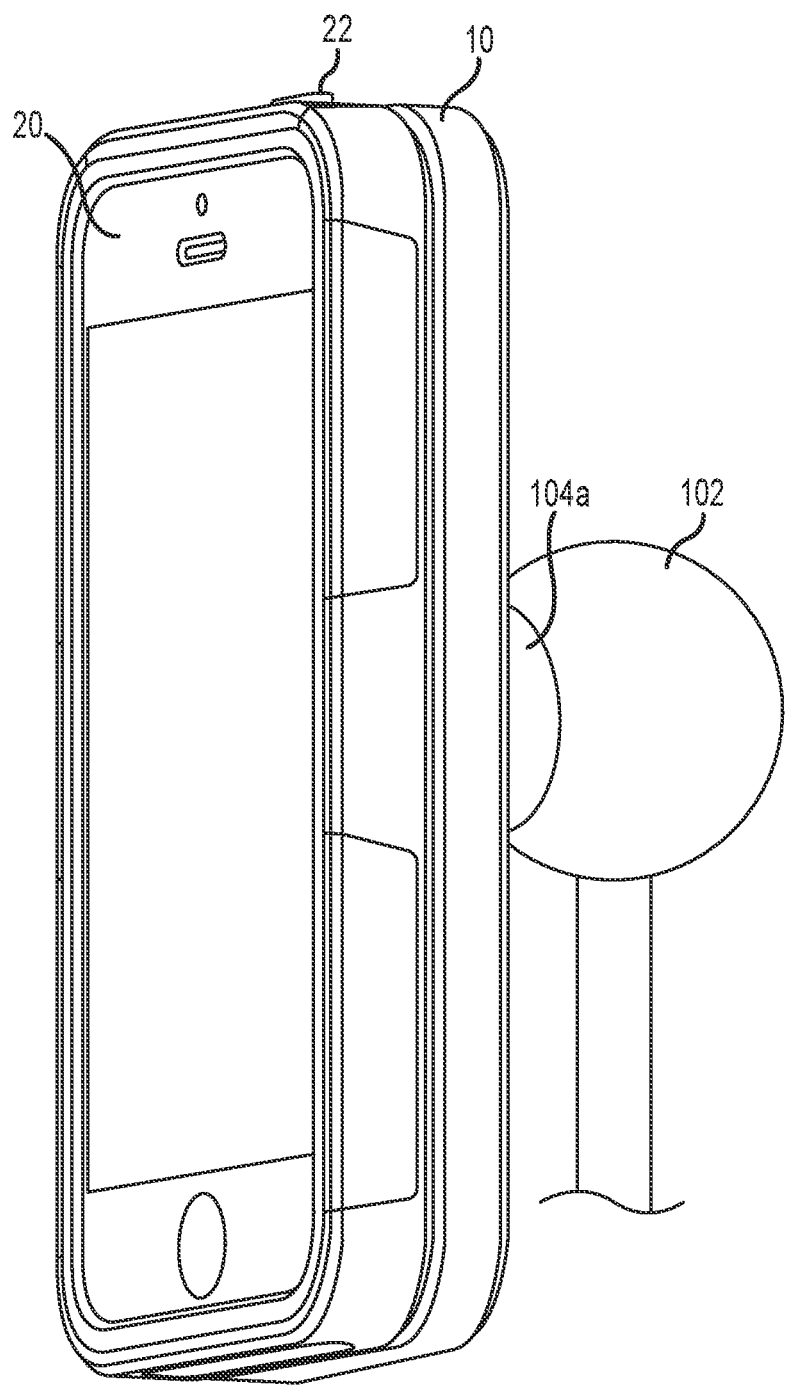
FIGS. 8-9 depict perspective views of an embodiment of a system for support of a plurality of devices in an attached configuration.
Figure 9:
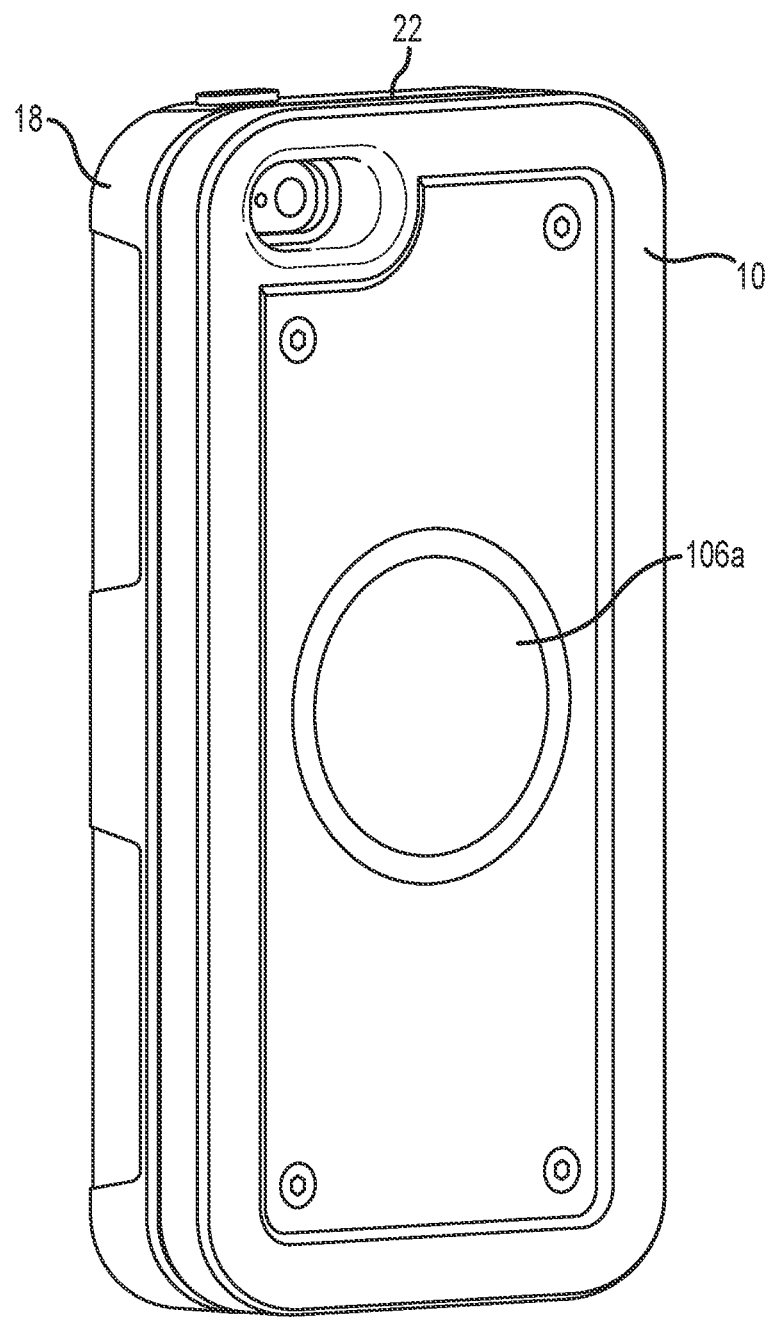
Figure 10:
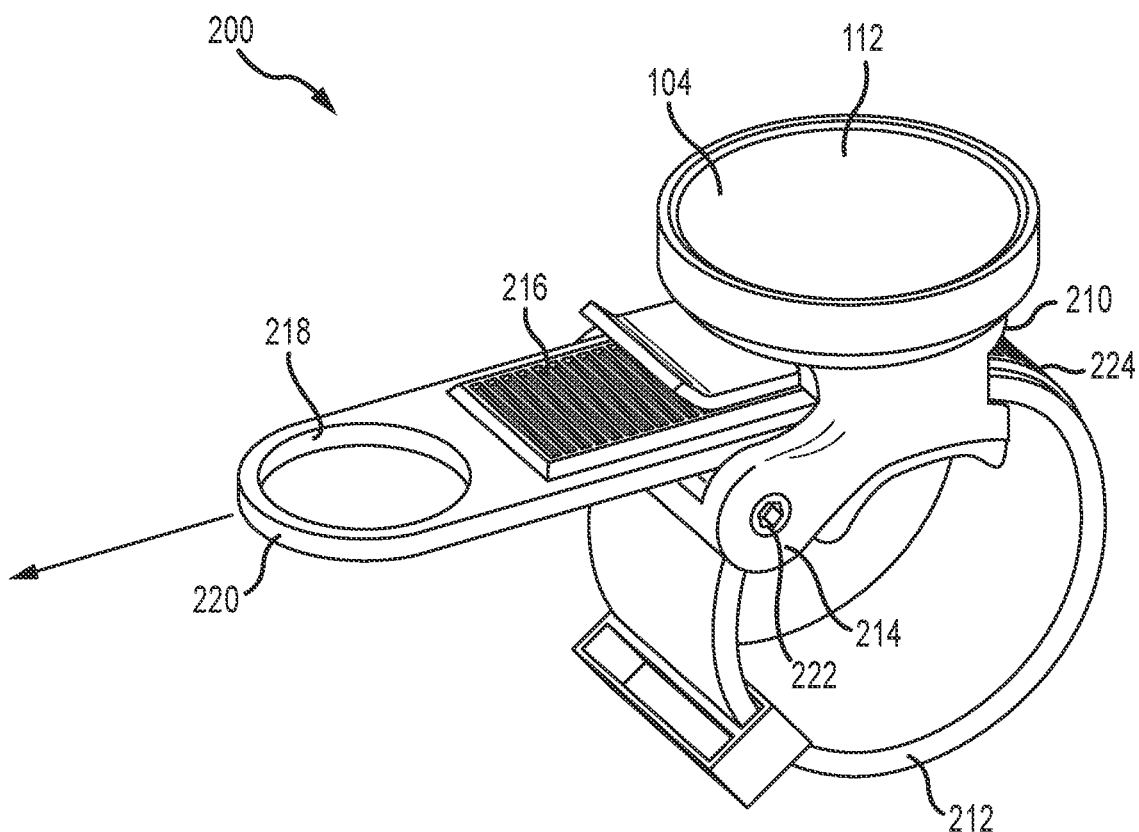
FIG. 10 depicts a perspective view of an embodiment of a base member for support of a device.

Accordingly, it may be further appreciated that corresponding attachment members 106 and carrier members 104 may be integrated into a device for use in a modular approach as provided by the system 100. For example, one such example of a device 10 with an integrated attachment member 106a and carrier member 104b is shown relation to FIGS. 6-9. Accordingly, with continued reference to FIGS. 6- and 7, the base member 102 is depicted with a first carrier member 104a operatively engaged therewith (e.g., by way of magnetic interaction between the base member 102 and the carrier member 104a). The first device 10 may include an attachment member 106a that is integrally provided with the device 10. Additionally, as best seen in FIG. 7, the first device 10 may include a carrier member 104b that is provided integrally with the device 10. As such, a second device 20, may be provided with a second attachment member 106b (best seen in FIG. 6). In this regard, the second attachment member 106b may interact with the carrier member 104b of the first device 10 so as to supportably engage the second device 20 to the first device 20 as shown in FIGS. 8 and 9.

As shown in FIGS. 6-9, the second device 20 may comprise a portable electronic computing device such as a smartphone or tablet computing device. In this regard, the attachment member 106b may be provided in a case or cover 22 that mechanically engages the device 20. In this regard, the first device 10 may comprise a device 10 that may communicate with the second device 20 (e.g., by way of wired or wireless connection). As may be appreciated, the second device 20 includes only one attachment member 106b. As such, the second device 20 may comprise a terminal device in the stack. However, additional devices may be provided in the stack between the second device 20 and the first carrier member 104a without limitation even though only a single device (e.g., the first device 10) is shown in FIG. 6-9. The additional devices in the device stack may comprise any appropriate device that may include a device in operative communication with the second device 20. For instance, the first device 10 or other additional devices not shown in FIGS. 6-9 may comprise one or more of a speaker, a battery, a solar panel, a projector, a camera, a camera accessory, a light, a cable management device, a writing instrument holder, a paper management device, or any other device that may or may not electronically communicate with the second device 20.

Accordingly, the first device 10 and the second device 20 (e.g., and potentially additional devices) make define a device stack that may provided such that each device in the stack is supportably engaged by way of cooperative magnetic engagement between corresponding respective carrier members 104 and attachment members 106 of the various devices. Furthermore, it may be appreciated that devices may be provided in the stack that are interrelated in order to perform a given task. For example, it may be appreciated that a mobile device may be provided as a device in the stack that may include communication abilities with other devices with the stack. For example, the device may include a smartphone or tablet computing device that may be capable of electronically communicating (e.g., by Wi-Fi, Bluetooth, cabled connection, or the like) with one or more additional devices in the stack. For example, another device in the stack may comprise a speaker that may receive audio information from the mobile device for playing over the speaker device. Furthermore, the stack may include a projector that may be communication with the mobile device in order to display an image or video from the mobile device. As such, the stack may comprise a presentation stack that may be provided such that the stack includes the mobile device a speaker device, a projector device, or any other device associated with the presentation that may be utilized together to provide functionality related to delivering a presentation. The entire stack may be further supported by a base member such as the base member 102 or other base such that the entire stack may be supported by the base on a substrate or surface. Additional stacks provided that include for example speakers, projectors, amplifiers, cameras, camera flashes, card readers, solar chargers, an additional battery or charger pack, or any other device that may be advantageously supportably engaged along with other devices in the stack. Additional tasks may be supported by device stacks that may include, for example, device stacks associated with tasks such as cooking stacks (e.g., potentially including a cookbook holder device, a utensil holding device, a light, a portable electronic device for display of recipes, etc.), reading stacks (e.g., potentially including a light, a book holder, portable electronic device for display a text, drink holder, reading last holder, etc.), driving stacks (e.g., potentially including a GPS receiver device, a portable electronic device for display of information, etc.), party stacks (e.g., potentially including speakers, lights, etc.), or other appropriate task specific stacks.

Furthermore, given that the interaction between the attachment member 106 and carrier member 104 may be similar for each device in a stack, it may be appreciated the devices may be used interchangeably within different stacks. Furthermore, given that a plurality of devices may include an attachment member that may be engaged with any other corresponding carrier member of the system, it may be appreciated that a stack or portions of a stack (e.g., including individual devices) may be utilized with other base members such that a device or a plurality of devices from the stack may be utilized with a number of different base members as described above in relation to transport of a one or more device from a first base to second base correspond to different locations for use in different instances. Additional devices may be provided that may provide additional functionality such as lights, or other devices that may be advantageously supported in a manner described herein.

Turning to FIGS. 10, 11, 12, and 13, an embodiment of a base member 200 that includes a carrier member 104 for use in supporting one or more devices as described above is shown. In this regard, the base member 200 may be utilized to support a single device or a plurality of devices in a modular system is described above in relation to the foregoing figures. In particular, the base member 200 may be particularly adapted to engage tubular support structure T (shown in phantom lines in FIGS. 11 and 12) such that the carrier member 104 of the base member 200 may be secured in relation to the tubular support member T for positioning one or more devices (e.g., a device 10 as shown in phantom in FIG. 12 that includes an attachment member 106 which is not shown) in relation to the tubular support member T engaged by the base member 200. The base member 200 may include a carrier member 104 that may include an interconnect portion 112 that comprises a magnetic portion including, potentially, a magnet as described above. The base member 200 may further include a support body 210 that may comprise an overmolded portion that houses the magnet corresponding to the magnetic portion of the interconnect portion 112 of the carrier member 104.

The support body 210 may include a strap 212 that is attached to the support body 210 at a hinge 214. In turn, the strap 212 may extend from the hinge 214 and be supported by the support body 210. Accordingly, the strap 212 may pivot about the hinge 214 to assist in securing the support body 210 to the tubular support structure T. The strap 210 may include a plurality of angled notches 216 and a pull loop 218. In this regard, the strap 212 may be passed about the tubular support member (e.g., T shown in FIG. 10) such that the strap 212 may extend about the tubular support member T. In turn, a distal end portion 220 of the strap 212 may be passed through a channel 224 of the support body 210. As such, the pull loop 218 may be grasped by a user to pull the strap 212 through the channel 224.

In turn, a tongue 226 having a pawl 228 may be provided. The pawl 228 may be disposed relative to the channel 224 such that when the distal end portion 220 of the strap 212 is passed through the channel 224, the pawl 228 may engage the notches 216 on the strap 212 to secure the distal portion 220 of the strap 212 relative to the support body 210. That is, the pawl 228 may allow the strap 212 to be advanced relative thereto when passing through the channel 224, but may not allow the distal end portion 220 to be reversibly moved relative to the channel 224 without disengagement of the pawl 228. In this regard, the strap 212 may be secured about the tubular support member T by passing the distal portion 220 of the strap 212 about the support member T and through the channel 224 such that the pawl 228 engages the notches 216 on the strap 212 to secure the strap 212. The support body 210 may also have a arcuate engagement portion 230 that may engage a portion of the tubular member about which the strap 212 may pass such that the arcuate member 230 engages a portion of the tubular support member to secure the support body 210 thereto. For instance, the arcuate member 230 may comprise an elastomeric pad (e.g., including a rubber material) for engagement with the tubular support member T. the arcuate number 230 comprising elastomeric pad may further prevent rotation of the support body 210 relative to the tubular member T. In turn, the carrier member 104 provided with the support body 210 may be operative to support the device 10.

Figure 11:
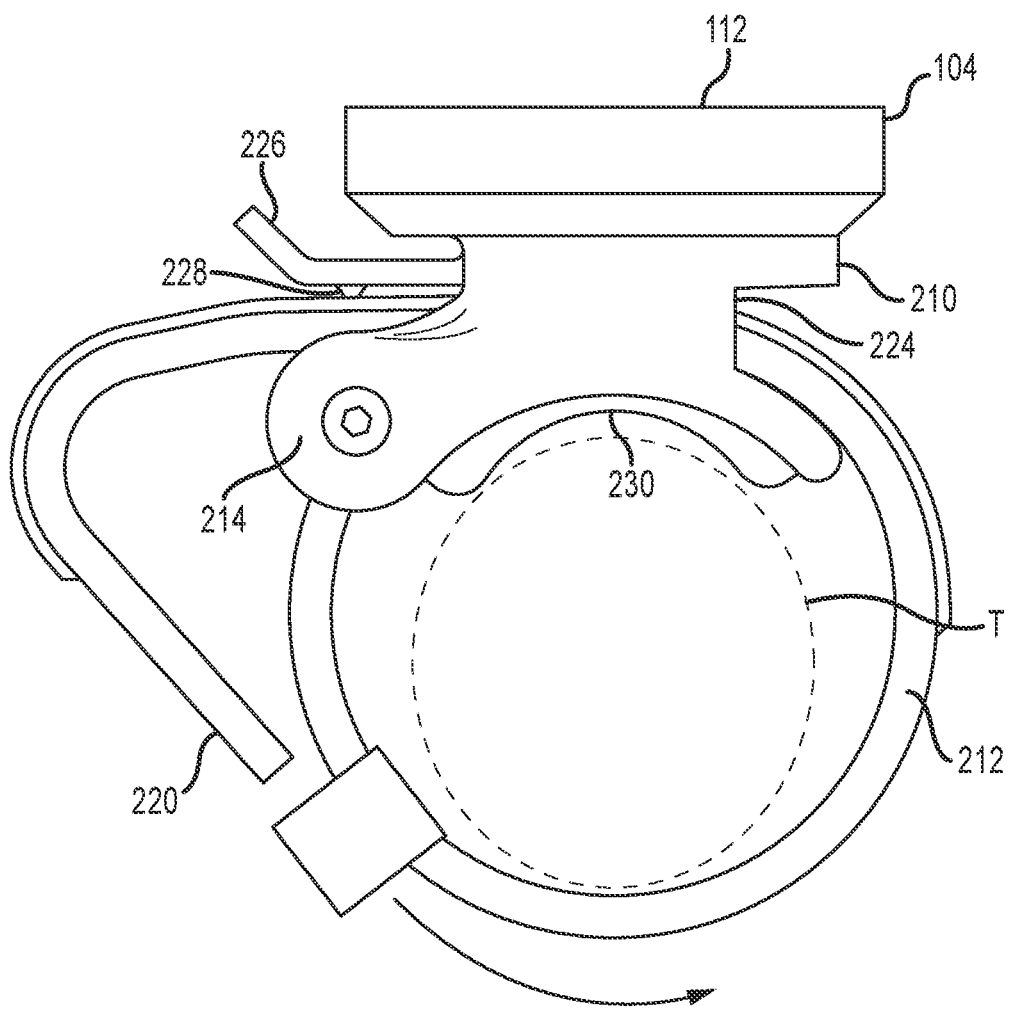
FIG. 11 depicts a side view of an embodiment of a base member for support of a device.
Figure 12:
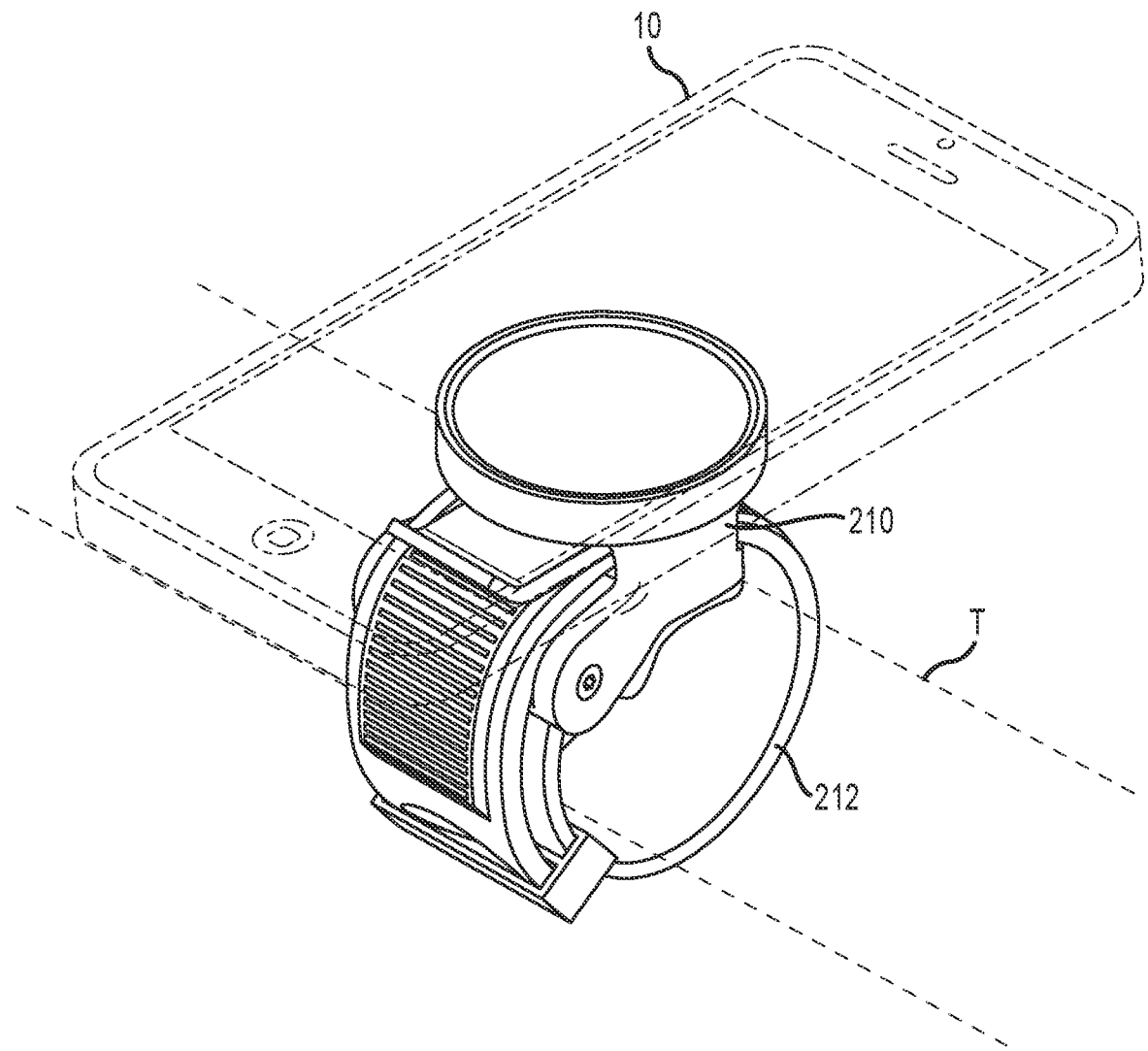
FIG. 12 depicts a perspective view of an embodiment of a base member for support of a device, which is shown in phantom.
Figure 13:
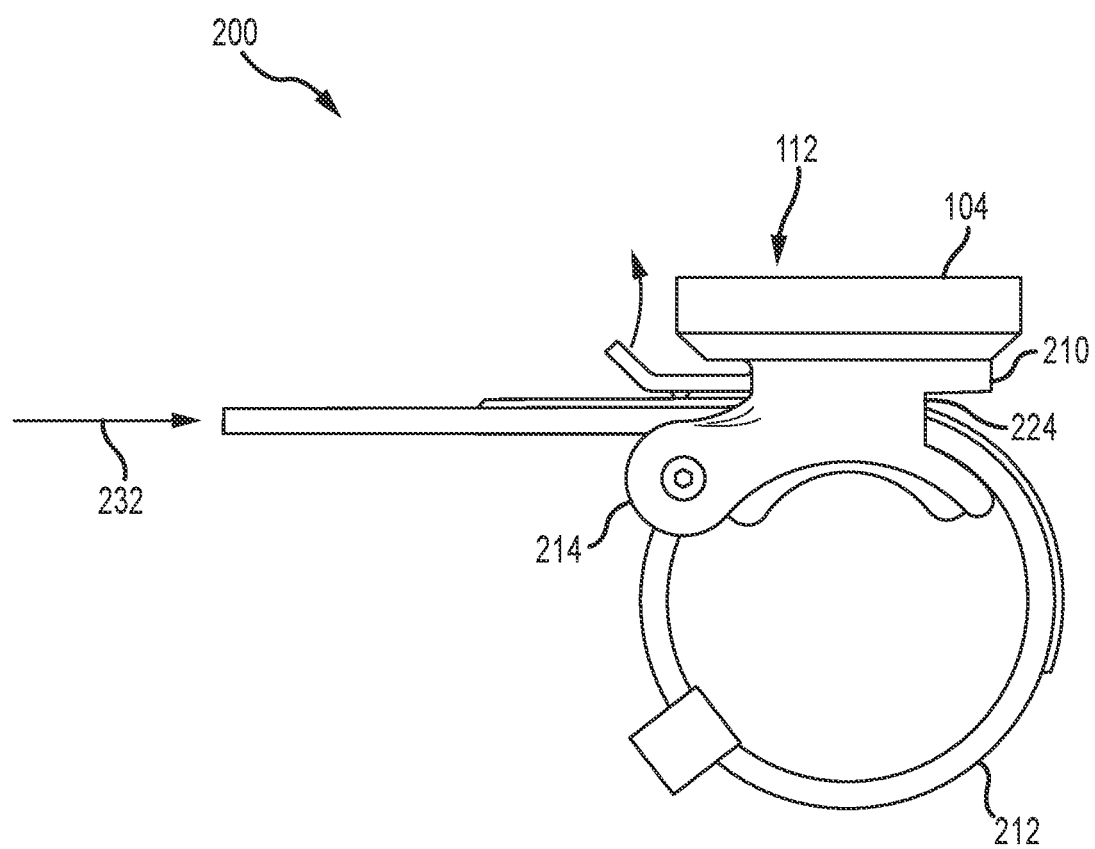
FIG. 13 depicts a side view of an embodiment of a base member for support of a device with a release mechanism to release a strap thereof.

To remove the base member 200 from the tubular member T, the tongue 226 may be displaced away from the strap 212 such that the pawl 228 disengages from the notches 216 on the strap such the strap 212 may be retracted as shown in the direction of the arrow 232 in FIG. 11 such that the strap 212 may be removed from the channel 224 and disengage from the tubular support member.

Engagement of a carrier member 104 with a tubular support member may be particularly useful, for example, in the context of a bicycle having a number of tubular frame members to which the base member 200 may be secured. For example, the base member 200 may be provided on a handlebar of the bicycle in a position such that the rider of the bicycle may be able to engage a device 10 with the carrier member 104 of the base member 200 such that the user may view the device during cycling. Furthermore, the base member 200 may be positioned such that the carrier member 104 may be disposed relative to a tubular member of the bicycle such that a device 10 comprising a camera may be positioned to record activities surrounding of the bicycle during movement of the bicycle. Furthermore, the base member 200 may be utilized to secure additional bicycling accessories or other devices to the bicycle.

Figure 14:
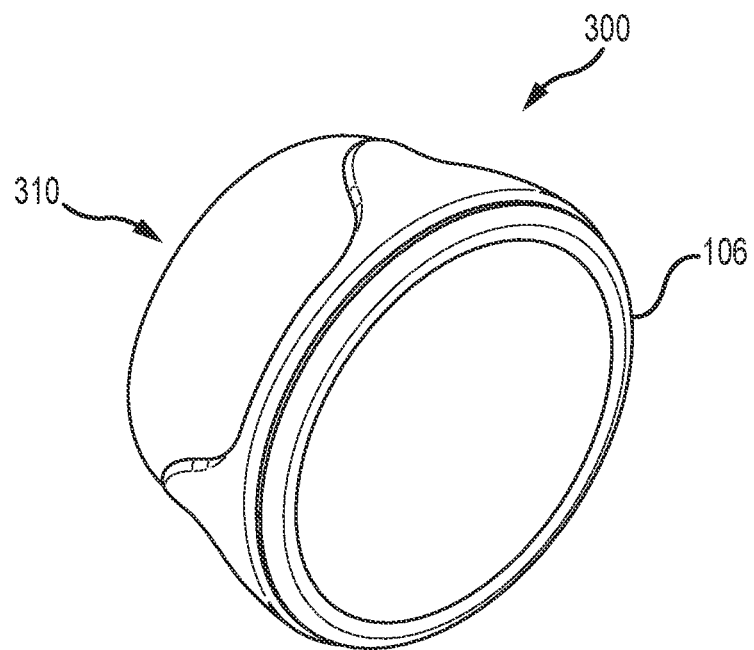
FIGS. 14 and 15 depict various perspective views of an embodiment of a light that may be supported by a mounting system described herein.
Figure 15:
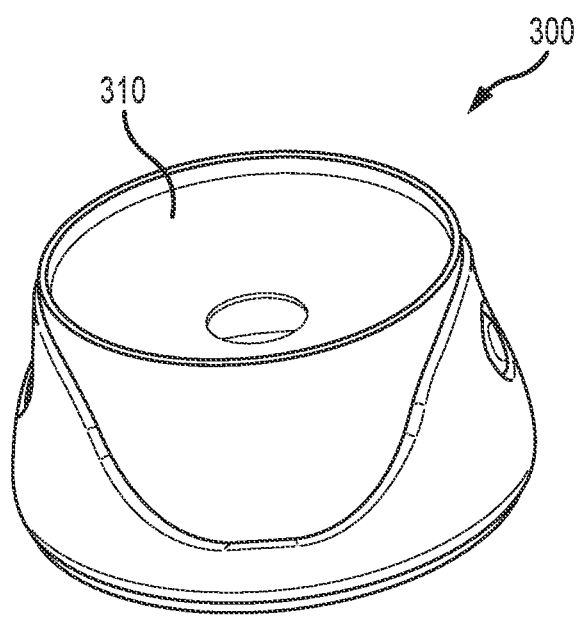

For example, shown in FIGS. 14 is and 15 is a light device 300 that may include an attachment member 106 on a portion of the device 300 opposite a light emitter 310. As such, the base member 200 may be secured to a tubular member of the bicycle at either the front and/or rear of the bicycle. In turn, a light device 300 like that shown in FIGS. 14 and 15 may be secured to the front and/or rear the bicycle. Furthermore, the light device 300 may be further utilized with any carrier member of a mounting system (e.g., including one other than the base member 200 such as base member 12 or base member 102 described above).

While the base member 200 is described above as engagement of a tubular support structure T, it may be appreciated that the base member 200 may be provided along any relatively slender member such as a member having a square or rectangular cross-section. That is, any support member about which the strap 212 may be provided around may be engaged by the base member 200 for supportive engagement of a device 10 relative to the support member. Furthermore, other base members having varying engagement structures may be provided such as for example, base members including carrier members that may be adapted for engagement of climate control vents in an automobile or the like.

Figure 16:
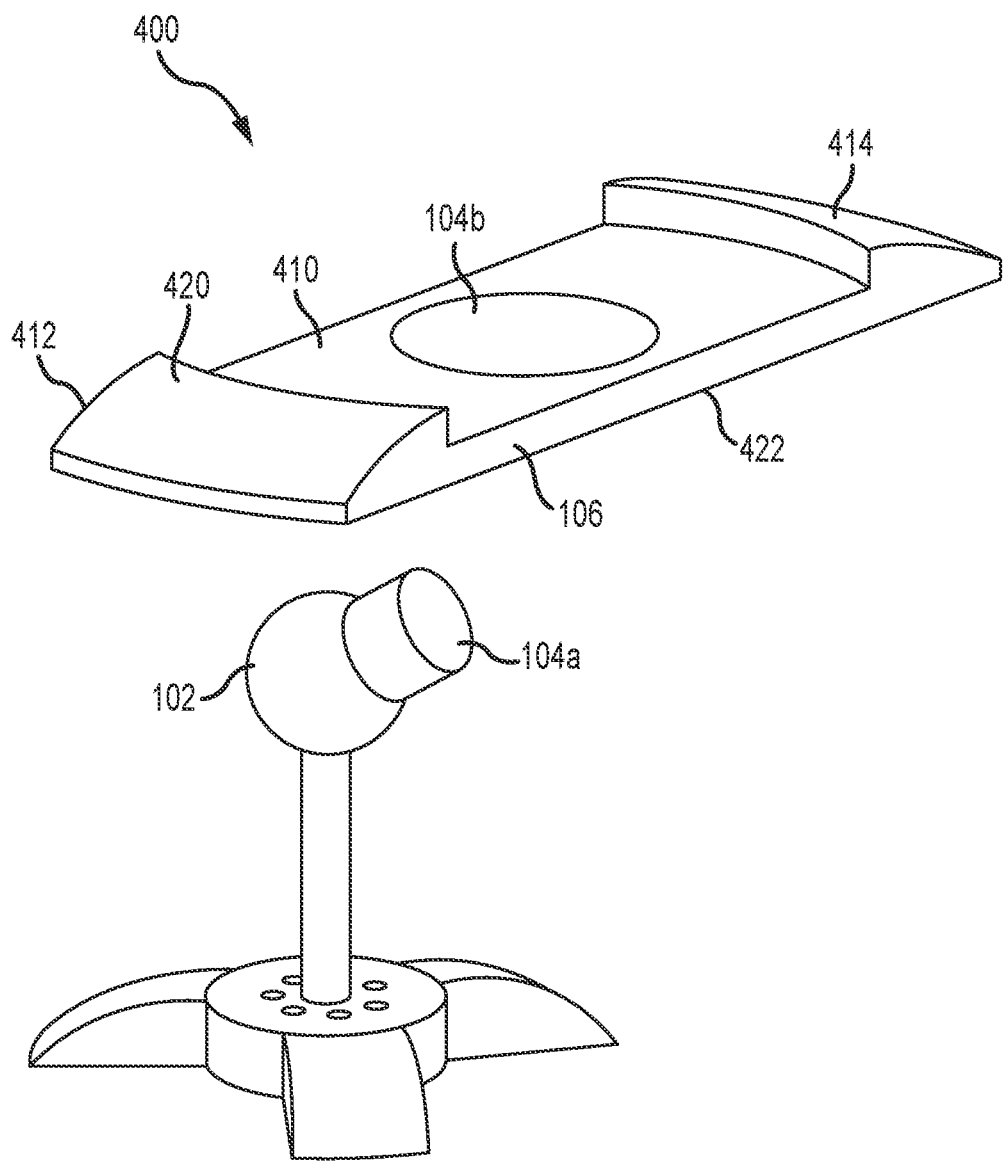
FIG. 16 depicts a perspective view of an embodiment of a device supportable by a system for modular support of devices.
Figure 17:
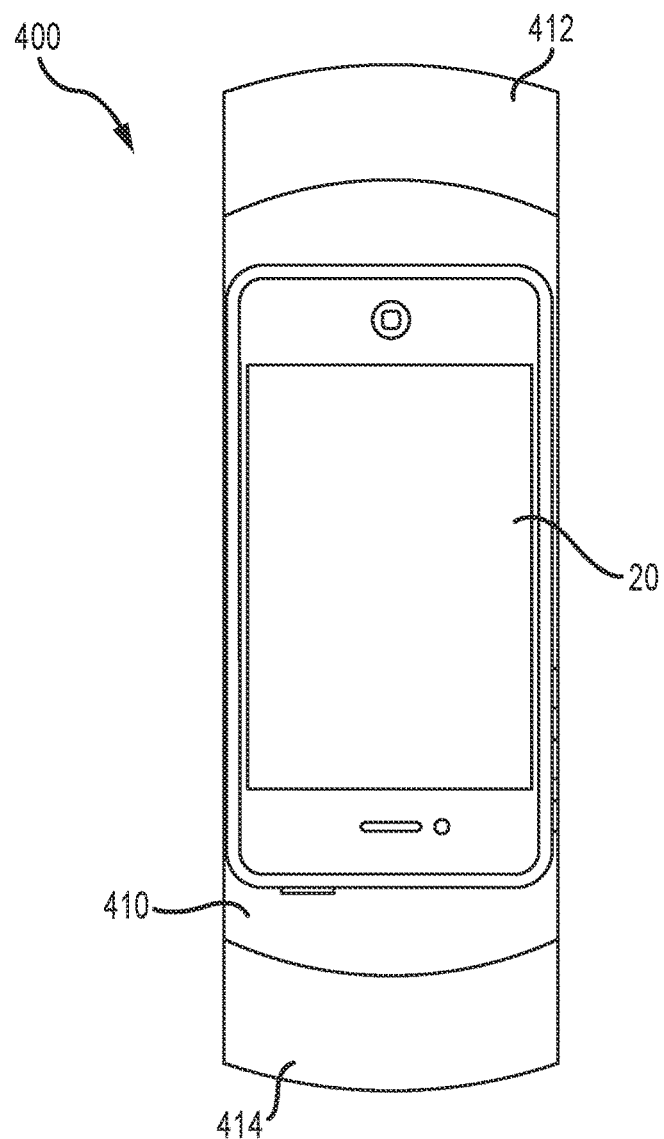
FIG. 17 depicts an elevation view of the embodiment of FIG. 16 engaged with another device.
Figure 18:
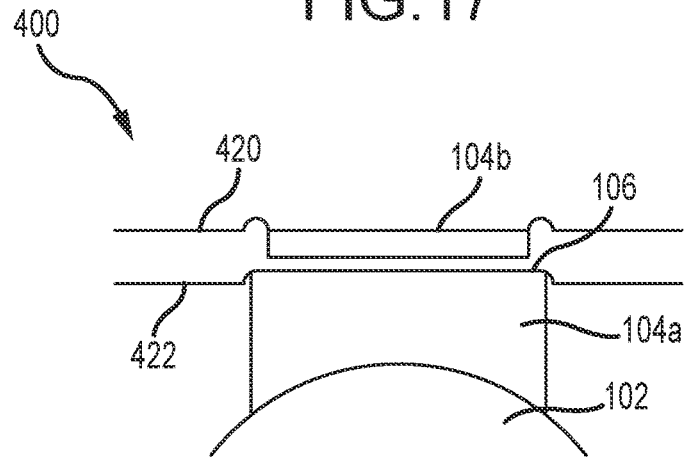
FIG. 18 depicts a side view of the embodiment of FIG. 16 engaged with a base.
Figure 19:
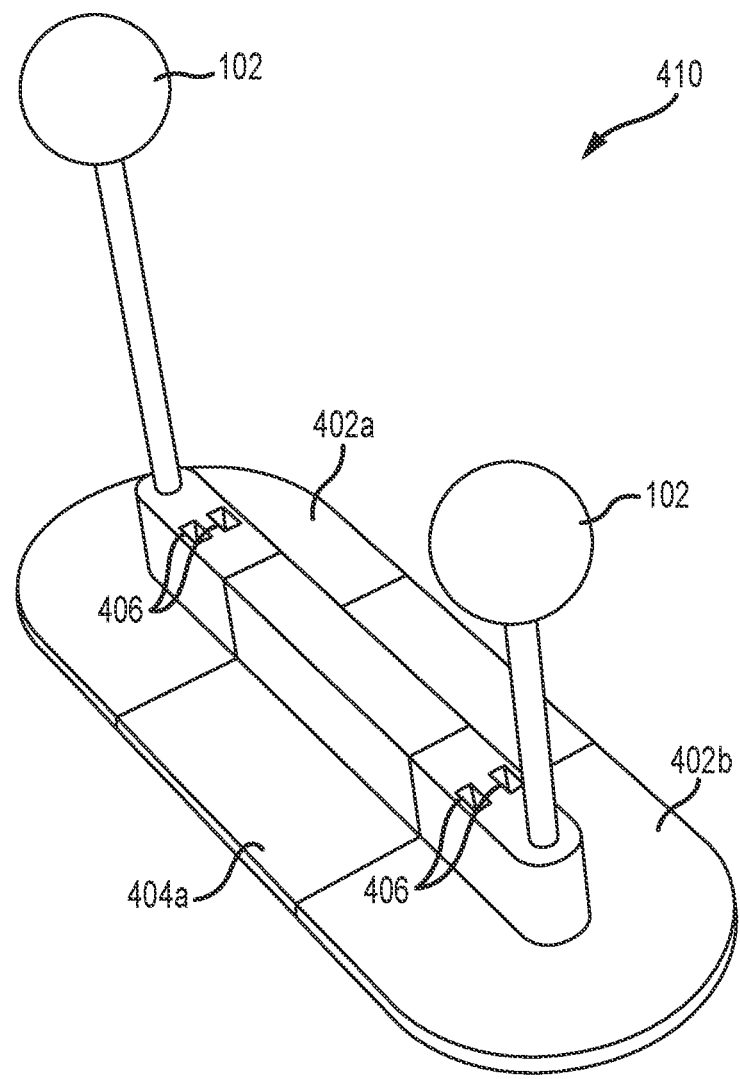
FIGS. 19-22 depict various modular base units that may be configured modularly.
Figure 20:
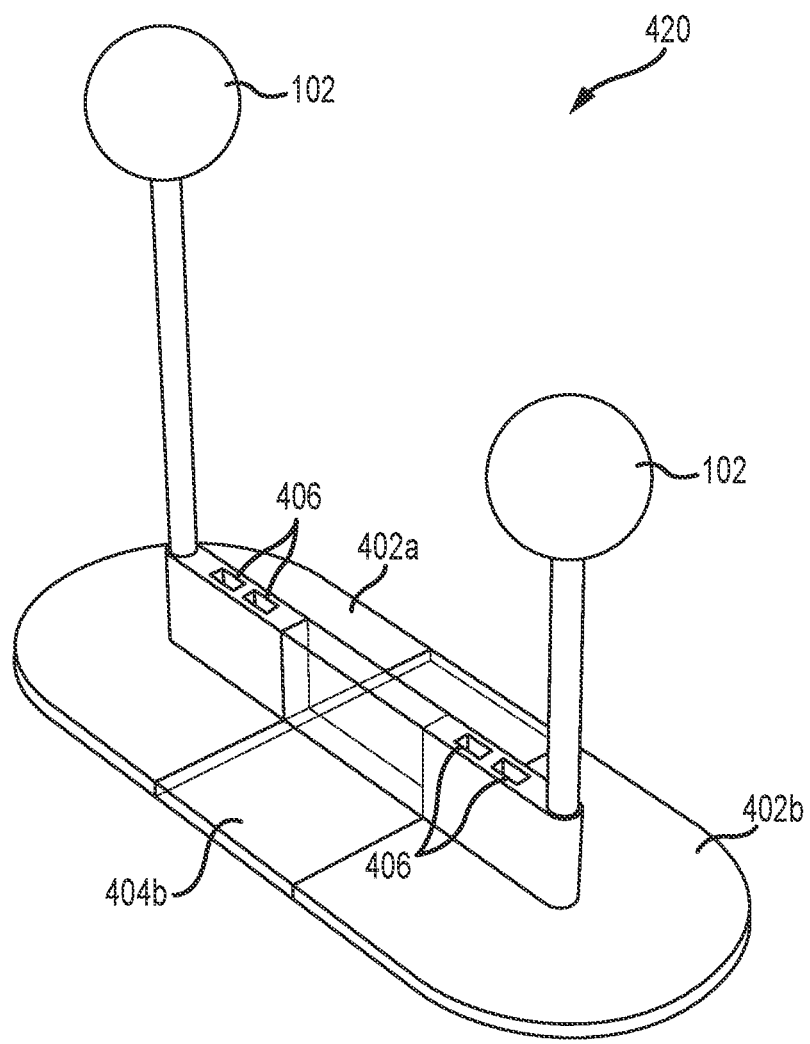

With further reference to FIGS. 16, 17, and 18, another embodiment of a device 400 that may be used in modular system 200 as described above is depicted. FIG. 16 depicts a perspective view of the device 400 without engagement with any other device. FIG. 17 depicts a top view of the device 400 with a second device 20 connected there with. FIG. 18 provides a cross-sectional view of the device 400 attached to a carrier member 104a that is in turn attached to a base member 102.

The device 400 generally includes a recess 410 provided in a first side 420 of the device 400. Within the recess is located a carrier member 104b as described above. On a second side 422 device opposite the first side 420, an attachment member 106 is provided for operative connection with a carrier member 104. A first extension 412 and a second extension 414 may be provided on opposite sides of the recess 410. The first extension 412 and the second extension 414 may extend beyond the width and height dimensions of a second device 20 engaged with the device 400. In this regard, a device 20 engaged with the device 400 may fit within the recess 410. The first and second extensions 412 and 414 may, in one example, house speaker assemblies. However, other devices may be provided in the first extension 412 and/or second extension 414 including, for example, lights, cameras, or other devices.

In this regard, the device 400 may be in operative communication with the device 20 supported by the device 400. For instance, audio information may be provided from the second device 22 device 400 for playing through the speaker assemblies provided in the first extension 412 and the second extension 414. While the second device 20 such as a smartphone or tablet computing device is shown connected to the device 400, it may be appreciated that another device having both an attachment member 106 as well as a further carrier member 104 you provided for further engagement of additional devices to create a further stack of devices.

With further reference to FIGS. 19, 20, 21, and 22, various embodiments of a modular base system 410-440 are depicted. For example, with reference to FIG. 19, a modular unit 410 is shown that may include a first modular base unit 402a and a second modular base unit 402b are shown. Each of the modular base units 402 may comprise a base member 102 for use as described above in relation to supporting device. The modular base units 402 may also include a power source (e.g., a battery, wired power plug, solar cell, etc.). In addition, either or both modular base units 402 may have connectivity to another device to support data communication to and/or from the modular base unit 402. Such data communication may be by way of a wireless interface (e.g., Bluetooth or the like) or a wired interface (e.g., USB or the like).

Furthermore, the first modular base unit 402a may engage a bridge member 404a. The second modular base unit 402b may also engage the bridge member 404a. In this regard, an engagement structure to physically connect the modular base units 402 with the bridge 404a may be provided such as, for example, clasps, male/female connectors, or the like. Furthermore, the bridge member 404a may include electrical ports engageable by one or more of the modular base units 402 to establish electrical communication between a modular base unit and the bridge member 404a. Furthermore, the bridge member 404a may establish electrical communication between the first modular base unit 402a and the second modular base unit 402b. In this regard, the bridge member 404a may provide an electrical bridge to connect the first modular base unit 402a and the second modular base unit 402b. This electrical bridge may facilitate exchange of power and/or data communications. Accordingly, a first of the first modular base unit 402a or the second modular base unit 402b may establish electrical communication by way of the bridge member 404a such that only a first of the modular base units need provide power and/or data communication. That is, the modular base units 402 may share an electrical interface by way of a single interface and may include electrical communication between the modular base units 402 by way of the bridge member 404a.

Furthermore, other embodiments of a bridge member 404 may be provided that include additional or alternative features as described below. For example, in FIG. 20 a modular unit 420 is depicted that may include a bridge member 404b that is engageable by modular base units 402a and 402b. The bridge member 404b may be at least partially or fully translucent or transparent. In this regard, either one or both the modular base units 402 may include a light that may be utilized to illuminate the bridge member 404b. In this regard, the modular unit 420 may at least partially function as a light provided by the illumination of the bridge member 404b by the first modular base unit 402a and/or second modular base unit 402b.

Figure 21:
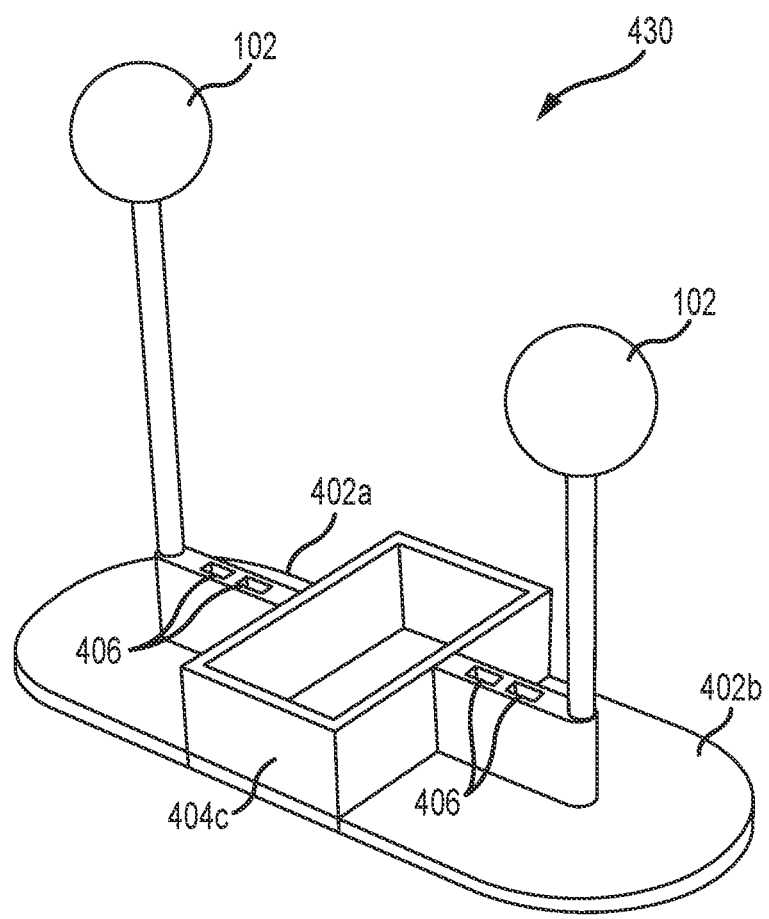
Figure 22:
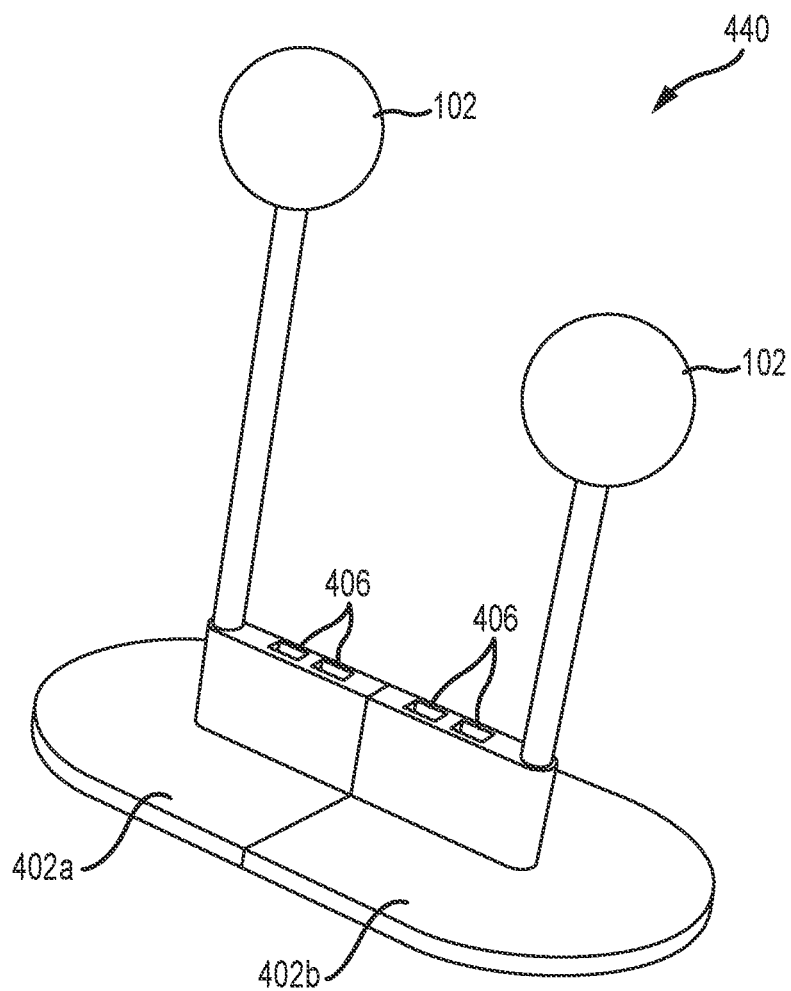

With further reference to FIG. 21, a modular unit 430 is shown having a bridge member 404c that may be configured to provide a storage volume in which items may be placed and/or stored. Further, as shown in FIG. 22, the first modular base unit 402a and second modular base unit 402b may be directly connected to provide electrical communication or the like between the first modular base unit 402a and the second modular base unit 402b. Other embodiments of bridge members 404 may be provided without limitation such that additional functionality may be provided such as, for example, bridge members 404 that include additional base members 102 for use in a system for supporting a device, further storage capabilities or arrangements than the configuration shown in FIG. 21, or additional devices such as, for example, speakers, monitors, projectors, or other hardware that may utilize mechanical and/or electrical connection with the first modular base unit 402a and the second modular base unit 402b.

In still further embodiments, additional modular base units 402 may be provided such that additional bridge members 404 and/or additional modular base units 402 may be provided without limitation. In this regard, the connections between the bridge members 404 or modular base units 402 may include mechanical and/or electrical communication between members to facilitate physical engagement as well as electrical engagement to provide power and/or data communication between the various modules. In this regard, any number of base units or bridge members may be facilitated as desired.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A system for supportive engagement of multiple devices, the system comprising:
 a modular base unit supportably engageable with a substrate;
 a first base member supported by the modular base unit, the first base member including a first carrier member comprising a first interconnect portion having a magnetic portion that is adapted for magnetic engagement with a first device to supportably engage the first device at the first base member;
 a second base member supported by the modular base unit, the second base member including a second carrier member comprising a second interconnect portion having a magnetic portion that is adapted for magnetic engagement with a second device to supportably engage the second device at the second base member; and a power supply operative to supply power to the first base member and the second base member for wireless interface with the first device and the second device when supportably engaged at the first base member and the second base member, respectively.

2. The system of claim 1, wherein the first carrier member is integrated into the first base member and the second carrier member is integrated into the second base member.

3. The system of claim 1, wherein the first carrier member is configured to magnetically interact with an attachment member associated with the first device and the second carrier member is configured to magnetically interact with an attachment member associated with the second device.

4. The system of claim 3, wherein the attachment member of at least one of the first device or the second device is integrated into the at least one of the first device or the second device.

5. The system of claim 1, wherein the first base member and the second base member is engaged with a bridge member.

6. The system of claim 5, wherein the bridge member comprises an additional base member for use in supporting another device.

7. The system of claim 1, wherein the first carrier member is positionable relative to the base first member for positioning of the first device relative to the first base member.

8. The system of claim 1, wherein the first base member is selectively engaged with the second base member to establish electrical communication therebetween.

9. The system of claim 1, wherein at least one of the first base member or the second base member comprises a convexly curved surface area.

10. The system of claim 1, wherein at least one of the first interconnect portion or the second interconnect portion is substantially planar.

11. The system of claim 1, wherein at least one of the first base member and the second base member extends from the modular base unit away from the substrate.

* * * * *